(12) United States Patent
Hirabayashi

(10) Patent No.: US 11,065,787 B2
(45) Date of Patent: Jul. 20, 2021

(54) COMPOSITE FORMING JIG AND COMPOSITE FORMING METHOD

(71) Applicant: SUBARU CORPORATION, Tokyo (JP)

(72) Inventor: Daisuke Hirabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 203 days.

(21) Appl. No.: 16/150,118

(22) Filed: Oct. 2, 2018

(65) Prior Publication Data

US 2019/0118420 A1    Apr. 25, 2019

(30) Foreign Application Priority Data

Oct. 25, 2017  (JP) .............................. JP2017-206313

(51) Int. Cl.
*B29C 33/76* (2006.01)
*B29C 70/34* (2006.01)
(Continued)

(52) U.S. Cl.
CPC ............ *B29C 33/76* (2013.01); *B29C 33/505* (2013.01); *B29C 70/342* (2013.01); *B29C 70/446* (2013.01); *B29C 70/48* (2013.01); *B29C 33/405* (2013.01); *B29K 2101/10* (2013.01); *B29K 2105/0872* (2013.01); *B29K 2883/00* (2013.01); *B29L 2031/3076* (2013.01)

(58) Field of Classification Search
CPC ............ B29D 99/0014; B29D 99/0017; B29C 33/485; B29C 33/76
See application file for complete search history.

(56) References Cited

U.S. PATENT DOCUMENTS 2,739,350 A  3/1956  Lampman
5,730,922 A  3/1998  Babb et al.
(Continued)

FOREIGN PATENT DOCUMENTS

CN    1513663 A    7/2004
CN    101549560 A   10/2009
(Continued)

OTHER PUBLICATIONS

Extended European Search Report dated Mar. 29, 2019 for European Patent Application No. 18198265.3-1019.
(Continued)

*Primary Examiner* — Scott W Dodds
(74) *Attorney, Agent, or Firm* — McGinn I.P. Law Group, PLLC.

(57) ABSTRACT

A composite forming method includes manufacturing either one of a composite structure body and a dry preform having a hollow region, and pulling a core out of the hollow region. In the manufacturing, a rubber-made core having a tubular structure is disposed at a portion that forms the hollow region of either one of the composite structure body and the dry preform. The core has a thickness varied in a direction perpendicular to a longitudinal direction to be foldable inward at a thin portion. In the pulling, the core is folded inward with air being discharged from an inside of the core after either one of the composite structure body and the dry preform is manufactured.

18 Claims, 15 Drawing Sheets

(51) Int. Cl.
*B29C 70/48* (2006.01)
*B29C 33/50* (2006.01)
*B29C 70/44* (2006.01)
B29L 31/30 (2006.01)
B29K 105/08 (2006.01)
B29K 101/10 (2006.01)
B29C 33/40 (2006.01)

(56) References Cited

U.S. PATENT DOCUMENTS

| | | | |
|---|---|---|---|
| 6,692,681 B1* | 2/2004 | Lunde | B29C 43/12 156/173 |
| 2002/0135090 A1 | 9/2002 | Koren | |
| 2003/0173459 A1* | 9/2003 | Fanucci | B64C 5/12 244/123.2 |
| 2004/0188882 A1 | 9/2004 | Matsumoto et al. | |
| 2005/0230552 A1* | 10/2005 | Engwall | B29C 33/485 244/133 |
| 2009/0166921 A1 | 7/2009 | Jacob et al. | |
| 2010/0139850 A1 | 6/2010 | Morris et al. | |
| 2011/0272086 A1 | 11/2011 | Dittman et al. | |
| 2012/0073596 A1 | 3/2012 | Holsteyns et al. | |
| 2012/0235336 A1 | 9/2012 | Sana et al. | |
| 2013/0036922 A1 | 2/2013 | Stewart et al. | |
| 2014/0070452 A1 | 3/2014 | Akiyama et al. | |
| 2016/0001467 A1 | 1/2016 | Gunther et al. | |

FOREIGN PATENT DOCUMENTS

| | | |
|---|---|---|
| CN | 104441689 A | 3/2015 |
| CN | 103118810 B | 7/2015 |
| DE | 10 2010 033 2 | 2/2012 |
| EP | 2 921 288 A1 | 9/2015 |
| JP | H 01-311436 A | 12/1989 |
| JP | H 04-332627 A | 11/1992 |
| JP | 2009-542460 A | 12/2009 |
| JP | 2011-098527 A | 5/2011 |
| JP | 2012-509779 A | 4/2012 |
| JP | 2016-013682 A | 1/2016 |
| JP | 2017-074782 A | 4/2017 |
| WO | WO 2004/000536 A1 | 12/2003 |
| WO | WO 2005/105402 A1 | 11/2005 |

OTHER PUBLICATIONS

Chinese Office Action, dated Mar. 9, 2021, in Chinese Application No. 201711162738.8.
Laura Wu.
Jing-ming Wang et al.

* cited by examiner

FIG. 19
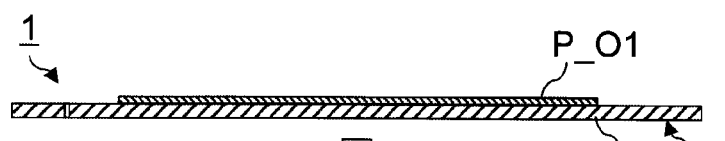
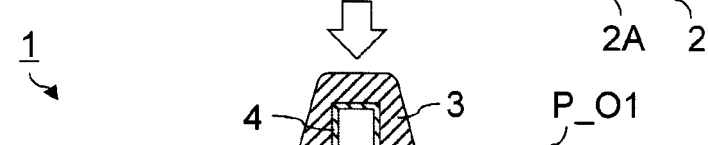
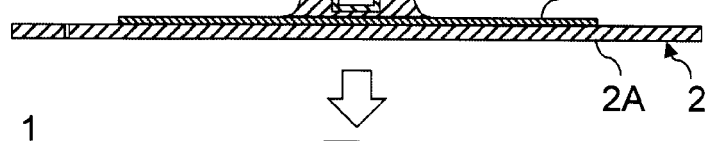
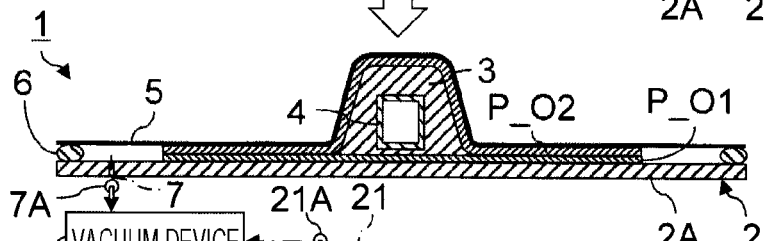
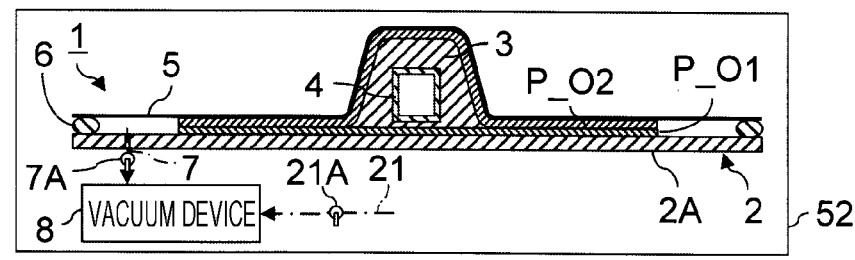
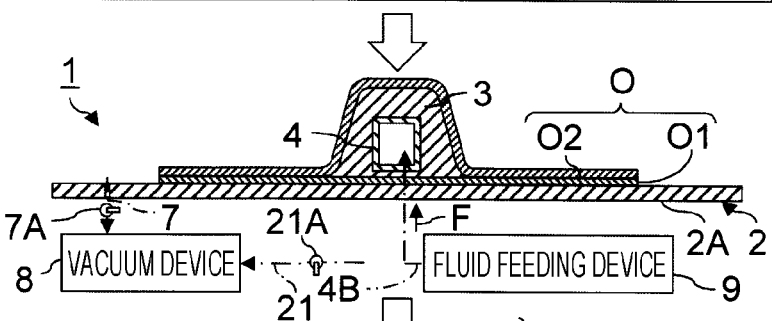
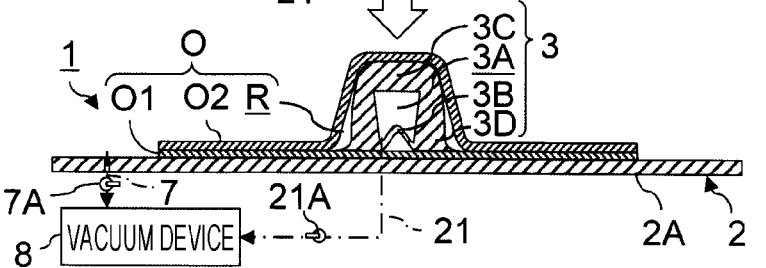

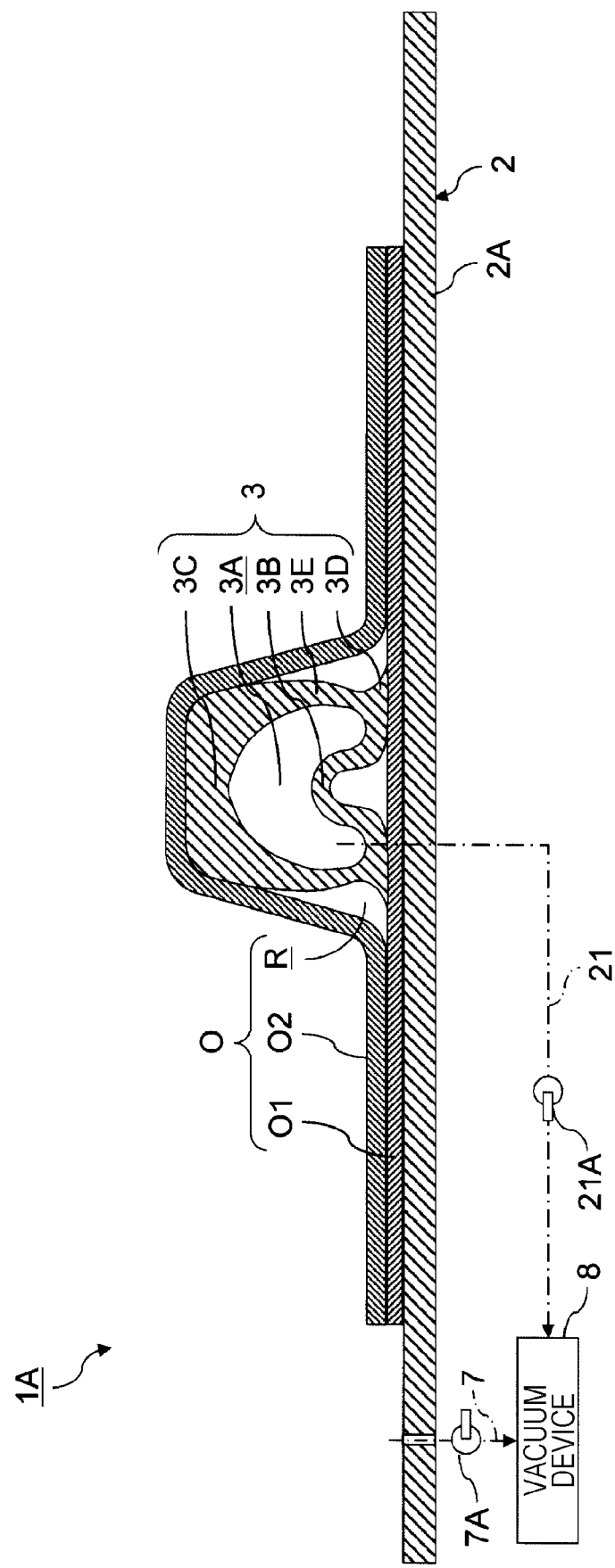

COMPOSITE FORMING JIG AND COMPOSITE FORMING METHOD

CROSS-REFERENCE TO RELATED APPLICATIONS

The present application claims priority from Japanese Patent Application No. 2017-206313 filed on Oct. 25, 2017, the entire contents of which are hereby incorporated by reference.

BACKGROUND

1. Technical Field

Examples of the present invention relate to a composite forming jig and a composite forming method.

2. Related Art

Composites, such as glass fiber reinforced plastics (GFRP) or carbon fiber reinforced plastics (CFRP) obtained by resin reinforced with fiber, have been used as materials of a structure body such as an aircraft structure body.

Examples known as a composite forming method include a resin transfer molding (RTM) method, and a method including laminating prepregs, which are fiber sheets impregnated with uncured thermosetting resin, forming a prepreg laminate into a shape of a finished product, vacuum bagging the laminate, and heat-curing the laminate with either one of an oven and an autoclave.

The RTM method is a method for forming a composite by laminating fiber sheets into the shape of the finished composite, vacuum bagging the fiber sheets to impregnate the fiber sheets with thermosetting resin, and heat-curing the fiber sheets. An example of the RTM method including covering of the fiber laminate with a bagging film to impregnate fiber with resin using the atmospheric pressure is referred to as a vacuum assisted resin transfer molding (VaRTM) method.

An operation for adjusting the shapes of prepregs and uncured resin with which fiber is impregnated in the RTM method is referred to as shaping to be distinguished from forming of a composite involving heat-curing.

To form a composite structure body having a hollow structure, a core needs to be disposed in the hollow portion (for instance, see Japanese Unexamined Patent Application Publication (Translation of PCT Application) (JP-T) No. 2009-542460, JP-T No. 2012-509779, Japanese Unexamined Patent Application Publication (JP-A) No. 2016-013682, JP-A No. 2011-098527, and JP-A No. 2017-074782). Examples of a composite structure body having a hollow structure include a structure body including a panel (skin) and reinforcing members, which are examples of an aircraft structure body such as hat-shaped or corrugated spars, ribs, or stringers, disposed on the panel. Specifically, to permanently affix reinforcing members having either one of a hat-shaped shape and a corrugated shape to a panel, a core needs to be disposed in the space between the reinforcing members and the panel.

Known examples of a core include a flexible bladder bag and a rigid core die. To retain the shape of uncured resin, a rigid core die is usually required. A stick-shaped core is also referred to as a mandrel.

SUMMARY OF THE INVENTION

An aspect of the present invention provides a composite forming method including manufacturing either one of a composite structure body and a dry preform having a hollow region by disposing a rubber-made core having a tubular structure at a portion that forms the hollow region of either one of the composite structure body and the dry preform, and pulling the core out of the hollow region by folding the core inward with air being discharged from an inside of the core after either one of the composite structure body and the dry preform is manufactured. The core has a thickness varied in a direction perpendicular to a longitudinal direction to be foldable inward at a thin portion;

An aspect of the present invention provides a composite forming jig configured to form either one of a composite structure body and a dry preform having a hollow region. The composite forming jig includes a rubber-made core and a vacuum tube. The rubber-made core has a tubular structure and has a thickness varied in a direction perpendicular to a longitudinal direction to be foldable inward at a thin portion. The core is disposed in the hollow region. The vacuum tube is configured to discharge air from an inside of the core to fold the core inward when the core is pulled out of the hollow region.

BRIEF DESCRIPTION OF THE DRAWINGS

FIG. 19 illustrates an operation flow for manufacturing a composite structure body by laminating prepregs using the composite forming jig illustrated in FIG. 1 and heat-curing the prepreg laminate;

FIG. 22 is a cross-sectional view of the state where the core illustrated in FIG. 20 is folded inward.

DETAILED DESCRIPTION

In the following, some preferred implementations of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

When a composite is formed with a core, the core needs to be pulled out of the formed composite. However, the core may be difficult to be pulled out of a composite having a narrow portion. Conversely, the shape of the composite may be restricted to allow the core to be pulled out of the composite.

It is desirable to facilitate manufacturing of a composite having a hollow structure.

First Implementation

Components and Functions of Composite Forming Jig

Figure 1:
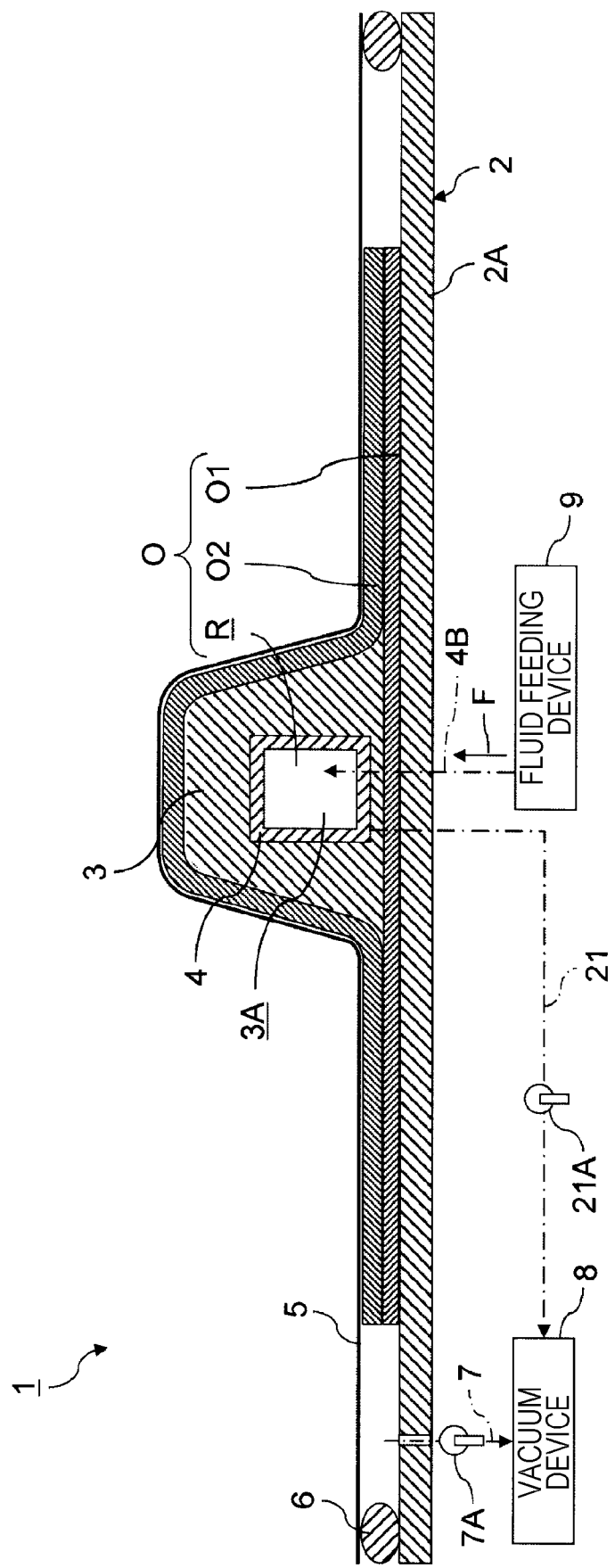
FIG. 1 is a cross-sectional view of components of a composite forming jig according to a first implementation of the present invention.
Figure 2:
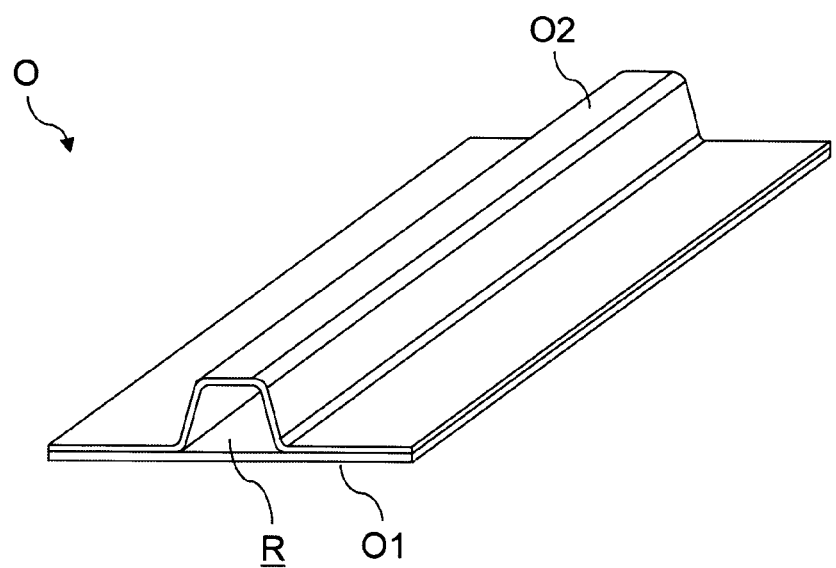
FIG. 2 is a perspective view of a structure example of a composite structure body having a hollow region manufactured by the composite forming jig illustrated in FIG. 1.

FIG. 1 is a cross-sectional view of components of a composite forming jig according to a first implementation of the present invention. FIG. 2 is a perspective view of a structure example of a composite structure body having a hollow region manufactured by the composite forming jig illustrated in FIG. 1.

A composite forming jig 1 is used to shape either one of a composite structure body O having a hollow region R illustrated in, for instance, FIG. 2 and a dry preform serving as a material of the composite structure body O. The composite forming jig 1 includes a rigid forming die 2, which allows either one of the composite structure body O and the dry preform to be mounted thereon while retaining the shape of either one of the composite structure body O and the dry preform, and a core 3, disposed in the hollow region R of the composite structure body O.

The core 3 is a non-rigid rubber jig having a tubular structure and an uneven thickness in the direction perpendicular to the longitudinal direction to be foldable inward at a thin portion. The core 3 having this structure can be easily pulled out by being folded inward after either one of the composite structure body O and the dry preform is manufactured.

For a thin core 3 incapable of retaining the shape of either one of the composite structure body O and the dry preform alone, a rigid reinforcing jig 4 having either one of a tubular shape and a stick shape may be inserted into the core 3 to allow the core 3 to maintain the function of retaining the shape.

Particularly, for either one of the composite structure body O and the dry preform having a long structure, the rubber-made core 3 manufactured corresponding to the hollow region R of either one of the composite structure body O and the dry preform is more easily folded in the direction perpendicular to the longitudinal direction. To address this situation, a linear reinforcing jig 4 is inserted into the core 3 to retain the cross-sectional shape of either one of the composite structure body O and the dry preform and to prevent the core 3 from being bent in the direction perpendicular to the longitudinal direction. Thus, the linearity of either one of the composite structure body O and the dry preform in the longitudinal direction can be preferably retained.

In contrast, for a thick core 3 capable of retaining the shape of either one of the composite structure body O and the dry preform alone, the reinforcing jig 4 may be omitted.

When the composite forming jig 1 is to manufacture the composite structure body O having a hollow region R, the composite structure body O can be manufactured by laminating prepregs, which are sheet-shaped fiber bundles impregnated with uncured thermosetting resin, shaping the prepregs, and heat-curing the shaped prepreg laminate. Alternatively, the composite forming jig 1 may manufacture the composite structure body O having the hollow region R by only the RTM method or by a hybrid method including heat-curing of the prepreg laminate and the RTM method.

The RTM method is a method for forming a composite including laminating fiber sheets, shaping the fiber sheets, impregnating the fiber laminate with uncured thermosetting resin, and heat-curing the fiber laminate. To manufacture the composite structure body O having the hollow region R by the RTM method, for instance, the forming die 2 may include a rigid upper die and a rigid lower die having surfaces that fit the shape of the composite structure body O. The upper die, the lower die, and the core 3 can be fixed in position by, for instance, a positioning jig to form a gap that fits the shape of the composite structure body O. At this time, a sheet-shaped fiber laminate can be disposed in the gap between the upper die, the lower die, and the core 3. Subsequently, uncured resin is injected while the gap between the upper die, the lower die, and the core 3 is being subjected to vacuum bagging to impregnate the fiber with the resin. Thereafter, the resin is heat-cured by a heating device to manufacture the composite structure body O.

Instead of the rigid upper die, the atmospheric pressure may be used. The RTM method including injecting of resin using the atmospheric pressure is referred to as a VaRTM method. Manufacturing of the composite structure body O with the VaRTM method does not require the rigid upper die and a device that moves the upper die, and thus can significantly reduce the manufacturing cost of the composite forming jig 1.

Either one of the prepreg laminate and the fiber laminate impregnated with uncured resin manufactured by the RTM method may be heat-cured by a heating device such as an oven or an autoclave. The composite forming jig 1 on which the composite structure body O before being heat-cured is mounted is introduced into the heating device. Alternatively, a heating device may be coupled to or installed in the forming die 2 of the composite forming jig 1.

Alternatively, the composite forming jig 1 may be used as a jig that shapes a dry preform. A dry preform is a material of the composite structure body O and is a fiber laminate before being impregnated with resin in the RTM method.

Also when the composite forming jig 1 shapes the dry preform, the forming die 2 including a rigid upper die and a rigid lower die having surfaces that fit the shape of the shaped dry preform may be used. Alternatively, as in the case of forming the composite structure body O, the atmospheric pressure may be used instead of the upper die.

More specifically, a dry preform having an intended shape can be manufactured by laminating fiber sheets and setting the forming die 2 and the core 3 in an appropriate order. To shape the dry preform, shaping the dry preform while heating the dry preform with a heating device and disposing a binder such as a thermoplastic binder between layers of the sheet-shaped fiber laminate is usually preferable to appropriately retain the shape of the shaped dry preform.

The composite forming jig 1 illustrated in FIG. 1 is an example of the composite structure body O having the shape illustrated in FIG. 2 manufactured using the atmospheric pressure. The composite forming jig 1 includes, besides the forming die 2 and the core 3, a bagging film 5 used for vacuum bagging. The rigid forming die 2 includes only a lower die 2A having a shape that fits the shape of the lower surface of the composite structure body O.

The bagging film 5 is bonded to the lower die 2A of the forming die 2 with a sealant 6. In order to discharge air from the region sealed in the bagging film 5 by vacuum bagging, the region sealed in the bagging film 5 can be coupled to a vacuum device 8 through a first vacuum tube 7. In the example illustrated in FIG. 1, the first vacuum tube 7 is coupled to an end portion of the lower die 2A. Instead, the first vacuum tube 7 may be coupled to the bagging film 5 with a mouthpiece disposed on the bagging film 5.

Figure 3:
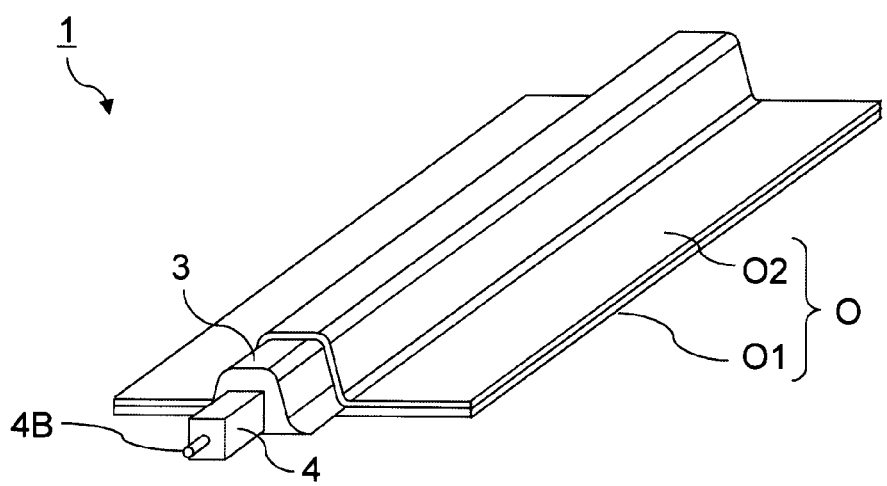
FIG. 3 is a perspective view of a reinforcing jig inserted into a core of the composite forming jig illustrated in FIG. 1 and set in the hollow region of the composite structure body illustrated in FIG. 2.

FIG. 3 is a perspective view of the reinforcing jig 4 inserted into the core 3 of the composite forming jig 1 illustrated in FIG. 1 and set in the hollow region R of the composite structure body O illustrated in FIG. 2.

The composite structure body O illustrated in FIG. 2 and FIG. 3 has a structure including a reinforcing member O2 having a hat-shaped cross section and attached onto the panel O1. The lower die 2A is thus a plate-shaped die having a flat surface corresponding to the surface of the panel O1. For the panel O1 having a curved surface, the lower die 2A may naturally have a curved surface that fits the surface of the panel O1.

On the other hand, the core 3 has a shape that fits the hollow region R between the panel O1 and the reinforcing member O2 having a hat-shaped cross section. The panel O1 is disposed on the lower die 2A, and the core 3 is disposed on the panel O1. In addition, the reinforcing member O2 having a hat-shaped cross section is disposed on the panel O1 on which the core 3 is mounted.

The entirety of the composite structure body O including the reinforcing member O2 and the panel O1 can be sealed in the bagging film 5. When the vacuum device 8 is activated to discharge air from the region covered by the bagging film 5 through the first vacuum tube 7, the pressure difference between the pressure in the region covered by the bagging film 5 and the atmospheric pressure can be applied to the reinforcing member O2 of the composite structure body O before and after being subjected to heat-curing.

Figure 4:
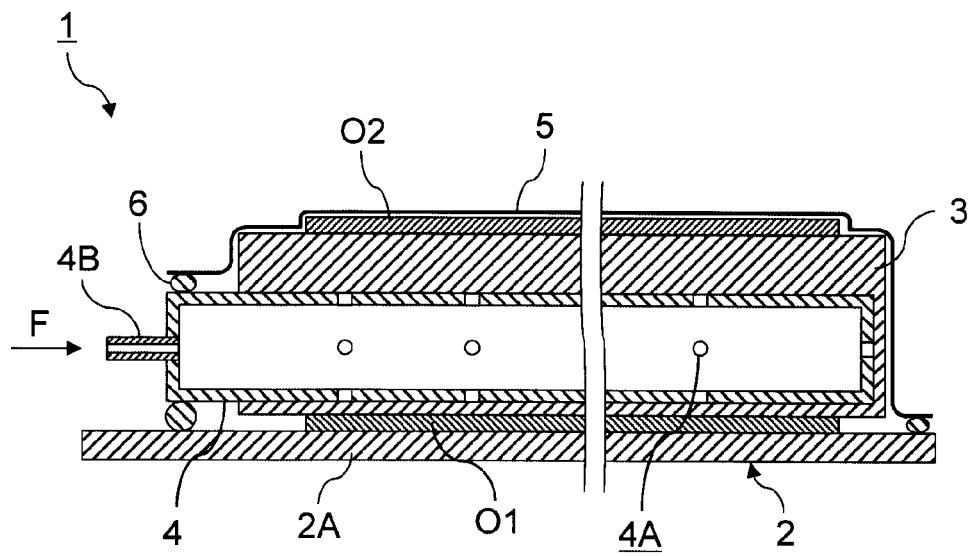
FIG. 4 is a vertical sectional view of components at end portions of the core during manufacturing of the composite structure body illustrated in FIG. 2.

FIG. 4 is a vertical sectional view of components at end portions of the core 3 during manufacturing of the composite structure body O illustrated in FIG. 2.

As illustrated in FIG. 1, the edges of the bagging film 5 substantially parallel to the longitudinal directions of the core 3 and the reinforcing member O2 can be bonded to the lower die 2A with the sealant 6. On the other hand, as illustrated in FIG. 4, the edges of the bagging film 5 substantially perpendicular to the longitudinal directions of the core 3 and the reinforcing member O2 can be bonded to either one of the lower die 2A and the reinforcing jig 4 with the sealant 6. The gap between the reinforcing jig 4 and the lower die 2A, corresponding to the sum thickness of the panel O1 and the core 3 can be also closed with the sealant 6.

Alternatively, the bagging film 5 may be bonded to the core 3 with the sealant 6 and the gap between the core 3 and the lower die 2A corresponding to the thickness of the panel O1 may be closed with the sealant 6. However, the rigid reinforcing jig 4 usually has higher adhesion with the sealant 6 than the core 3, which is made of rubber. As another sealing method, a fluid feeding tube 4B, which is attached to an end portion of the reinforcing jig 4 and described later, may be folded to extend along the lower die 2A, and the bagging film 5 may be bonded to the fluid feeding tube 4B and the lower die 2A with the sealant 6.

Thus, the region between the lower die 2A, the core 3, and the bagging film 5 can be sealed, and the vacuum device 8 can perform vacuum bagging on the region. Specifically, air is discharged from the region covered with the bagging film 5 to apply the atmospheric pressure to either one of the uncured composite structure body O and the fiber laminate for a dry preform.

When the composite structure body O is manufactured, the uncured composite structure body O is heat-cured by the heating device. When the dry preform it manufactured, on the other hand, the fiber laminate is shaped while being heated by the heating device as needed.

In this manner, the composite structure body O including the reinforcing member O2 having a hat-shaped cross section and attached to the panel O1 can be manufactured using the core 3 and the lower die 2A having shapes corresponding to the shapes of the reinforcing member O2 having a hat-shaped cross section and the panel O1. Also in the case of manufacturing a dry preform, the dry preform can be manufactured using the core 3 having a shape that fits the hollow region R between the panel O1 and the reinforcing member O2 having a hat-shaped cross section, and the lower die 2A having a shape that fits the surface of the panel O1.

After either one of the composite structure body O and the dry preform is manufactured, the manufactured one of the composite structure body O and the dry preform needs to be removed from the composite forming jig 1. Thus, a first stopcock 7A is closed and the bagging film 5 and the sealant 6 are removed using, for instance, a solvent.

In addition, the core 3 needs to be pulled out of the hollow region R of either one of the composite structure body O and the dry preform. If the reinforcing jig 4 is additionally inserted into the core 3 having a hollow structure, the reinforcing jig 4 needs to be pulled out of the core 3 to allow the core 3 to be folded inward.

To allow the reinforcing jig 4 to be easily pulled out of the core 3, the core 3 preferably has a hole 3A having a depth in the longitudinal direction of the core 3 without an edge and a protrusion. In the illustrated example, the hole 3A having a rectangular cross section extends along the center axis of the core 3. The reinforcing jig 4 having a rectangular cross section is inserted into the hole 3A of the core 3.

In the illustrated example, the hole 3A in the core 3 has a uniform cross section, but may have a tapered cross section to facilitate insertion of the reinforcing jig 4 into the core 3 and pullout of the reinforcing jig 4 from the core 3. Specifically, the hole 3A in the core 3 and the reinforcing jig 4 may be tapered to be gradually thinned in the direction opposite to the direction in which the reinforcing jig 4 is pulled out of the core 3.

To facilitate pullout of the reinforcing jig 4 from the core 3, the reinforcing jig 4 is preferably made of a material such as CFRP or a metal having a low coefficient of friction. Manufacturing of the composite structure body O involves heating. Thus, the composite structure body O, the reinforcing jig 4, and the core 3 each expand by the length corresponding to the coefficient of linear expansion. Thus, preferably, pullout of the reinforcing jig 4 from the core 3 is facilitated using the difference in coefficient of linear expansion between the reinforcing jig 4 and the core 3. Specifically, preferably, the materials of the reinforcing jig 4 and the core 3 are determined to keep a large difference in coefficient of linear expansion between the reinforcing jig 4 and the core 3, so that a gap is easily formed between the reinforcing jig 4 and the core 3 immediately after the composite structure body O is heat-cured.

As in the case of manufacturing the composite structure body O, when a dry preform is manufactured, the dry preform is shaped while being heated, so that pullout of the reinforcing jig 4 from the core 3 can be facilitated using the difference in coefficient of linear expansion.

Various kinds of rubber are usable as a material of the core 3. For instance, silicone rubber has a coefficient of linear expansion of 250 to $400 \times 10^{(-6)}/°$ C., polyurethane rubber has a coefficient of linear expansion of 100 to $120 \times 10^{(-6)}/°$ C., ethylene propylene rubber has a coefficient of linear expansion of 230 to $240 \times 10^{(-6)}/°$ C., chloroprene rubber has a coefficient of linear expansion of $200 \times 10^{(-6)}/°$ C., nitrile rubber has a coefficient of linear expansion of 65 to $240 \times 10^{(-6)}/°$ C., and fluorocarbon rubber has a coefficient of linear expansion of 10 to $100 \times 10^{(-6)}/°$ C. Besides the above, other kinds of rubber are commercially available.

Aluminum, which is a prospective material for the reinforcing jig 4, has a coefficient of linear expansion of approximately 23 to $25 \times 10^{(-6)}/°$ C., an iron-based metal such as a stainless steel has a coefficient of linear expansion of approximately 10 to $18 \times 10^{(-6)}/°$ C., and CFRP has a coefficient of linear expansion of approximately 0 to $4 \times 10^{(-6)}/°$ C. Other metals have a coefficient of linear expansion of approximately similar to those of aluminum and a stainless steel.

To facilitate pullout of the reinforcing jig 4 from the core 3, appropriately determining the materials of the reinforcing jig 4 and the core 3 is important. Particularly, different kinds of rubber have extraordinarily different coefficients of linear expansion. Thus, selecting an appropriate kind is important.

Specifically, the reinforcing jig 4 is preferably made of either one of metal and CFRP and the core 3 is preferably made of either one of silicone rubber and rubber having a coefficient of linear expansion similar to that of the silicone rubber to facilitate pullout of the reinforcing jig 4 from the core 3 using the difference in coefficient of linear expansion. Particularly, silicone rubber having a large coefficient of linear expansion is highly versatile and easily available. On the other hand, CFRP has a small coefficient of linear expansion but the reinforcing jig 4 made of CFRP requires high manufacturing cost. Thus, it is practical to form the reinforcing jig 4 with an iron-based metal, such as a stainless steel having a small coefficient of linear expansion and easily available among various kinds of metals, and to form the core 3 with silicone rubber.

To facilitate pullout of the reinforcing jig 4 from the core 3, besides using the difference in coefficient of linear expansion between the reinforcing jig 4 and the core 3, a fluid F may be injected between the reinforcing jig 4 and the core 3. However, test results have revealed that increasing the difference in coefficient of linear expansion between the reinforcing jig 4 and the core 3 is more important than injecting the fluid F in order to facilitate pullout of the reinforcing jig 4 from the core 3. Thus, injection of the fluid F is considered to be performed supplementally as needed.

To inject the fluid F between the reinforcing jig 4 and the core 3, the reinforcing jig 4 may have a hollow structure and the reinforcing jig 4 may have jet ports 4A for the fluid F, as illustrated in FIG. 4. The reinforcing jig 4 may have an open end at one end, and the fluid feeding tube 4B for the fluid F coupled to the other end from which the reinforcing jig 4 is pulled out. Thus, the fluid feeding tube 4B can be coupled to a fluid feeding device 9.

Thus, the fluid F can flow through the inside of the tubular reinforcing jig 4, and the fluid F fed from the fluid feeding device 9 through the fluid feeding tube 4B can be jetted out of the jet ports 4A of the reinforcing jig 4. Specifically, the fluid F can be injected between the reinforcing jig 4 and the core 3.

Figure 5:
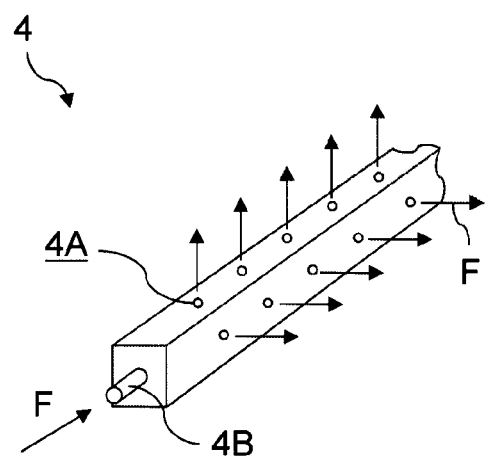
FIG. 5 is a perspective view of an example of the reinforcing jig illustrated in FIG. 1 having fluid jet ports.

FIG. 5 is a perspective view of an example of the reinforcing jig 4 illustrated in FIG. 1 having the jet ports 4A for the fluid F.

As illustrated in FIG. 5, the tubular reinforcing jig 4 having a rectangular cross section may have jet ports 4A for the fluid F at appropriate intervals in each surface. The intervals of the jet ports 4A for the fluid F may be determined through experiments for the fluid F to be fed enough between the reinforcing jig 4 and the core 3 as to facilitate pullout of the reinforcing jig 4 from the core 3.

The fluid F injected between the reinforcing jig 4 and the core 3 may be air or liquid such as a lubricant or water. Particularly, an oil-based lubricant injected between the reinforcing jig 4 and the core 3 can facilitate pullout of the reinforcing jig 4. On the other hand, air injected between the reinforcing jig 4 and the core 3 may be compressed air ordinarily equipped in a typical factory, and thus can simplify the necessary equipment in the factory in which the composite forming jig 1 is installed. Specifically, a general-purpose compressed air cylinder may be used as the fluid feeding device 9.

The fluid F injected between the reinforcing jig 4 and the core 3 can enlarge the gap between the reinforcing jig 4 and the core 3. Particularly, the gap between the reinforcing jig 4 and the core 3 can be effectively enlarged using the difference in coefficient of linear expansion between the composite structure body O and the core 3.

Figure 6A:
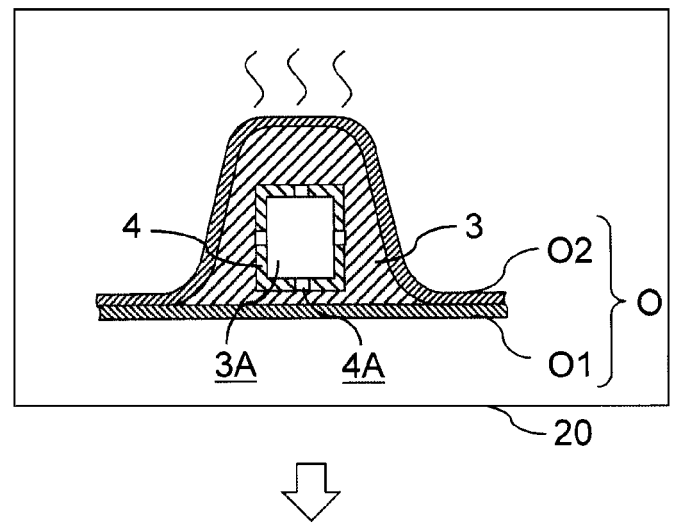
FIGS. 6A, 6B, and 6C illustrate a method for enlarging a gap between the reinforcing jig and the core illustrated in FIG. 1 by injecting a fluid between the reinforcing jig and the core and using the difference in coefficient of linear expansion between the composite structure body and the core.
Figure 6B:
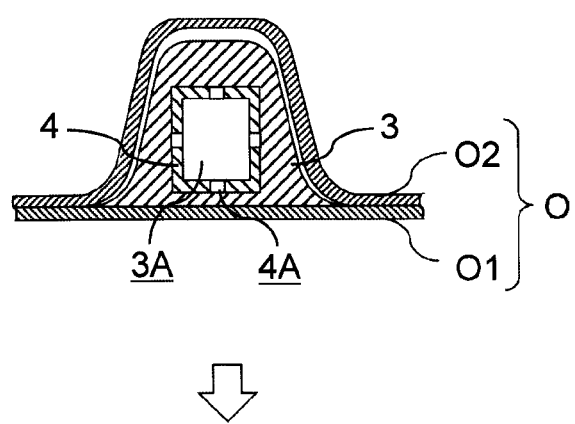
Figure 6C:
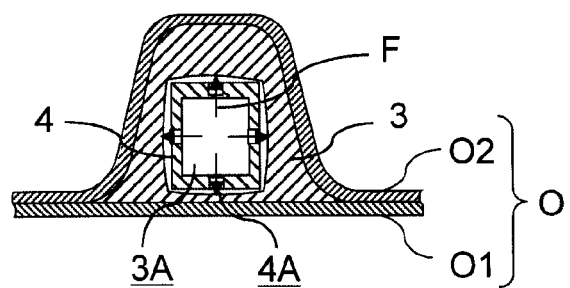

FIGS. 6A, 6B, and 6C illustrate a method for enlarging the gap between the reinforcing jig 4 and the core 3 by injecting the fluid F between the reinforcing jig 4 and the core 3 illustrated in FIG. 1, and by using the difference in coefficient of linear expansion between the composite structure body O and the core 3.

When the composite structure body O is heat-cured by a heating device 20, the reinforcing jig 4 and the core 3 are thermally expanded, and as illustrated in FIG. 6A, the composite structure body O is manufactured while being in close contact with the thermally expanded core 3. When the composite structure body O, the core 3, and the reinforcing jig 4 are cooled after the composite structure body O is manufactured, the composite structure body O, the core 3, and the reinforcing jig 4 reduce their sizes. However, the core 3 has its size reduced slightly more than the composite structure body O due to the difference in coefficient of linear expansion between the composite structure body O and the core 3.

As illustrated in FIG. 6B in an exaggerated manner, a gap is formed between the composite structure body O and the core 3. When the fluid F is jetted from the jet ports 4A of the reinforcing jig 4 after the gap is formed between the composite structure body O and the core 3, the core 3, which is slightly smaller than the composite structure body O, can be slightly expanded with the pressure of the fluid F, as illustrated in FIG. 6C in an exaggerated manner. Thus, the gap between the composite structure body O and the core 3 is lost and, instead, a gap is formed between the reinforcing jig 4 and the core 3.

Thus, a flow path for the fluid F such as air is formed between the reinforcing jig 4 and the core 3, and the fluid F can be injected between the reinforcing jig 4 and the core 3. When the fluid F is injected between the reinforcing jig 4 and the core 3, the reinforcing jig 4 floats in the fluid F and can be easily pulled out of the core 3.

For the reinforcing jig 4 that is extremely long, the fluid F leaks out of the jet ports 4A not covered by the core 3, and the uncovered portion may fail to be easily pulled out of the core 3. In such a case, the jet ports 4A not covered with the core 3 may be covered with, for instance, a tape to continue pullout of the reinforcing jig 4.

Alternatively, the jet ports 4A for the fluid F may be formed only near the end portion of the reinforcing jig 4 closer to the open end of the core 3. Particularly, the fluid F jetted into the open end of the core 3 enables pullout of the reinforcing jig 4 with the pressure of the fluid F.

The reinforcing jig 4 may have a foldable structure including, for instance, a hinge. In this case, the reinforcing jig 4 can be pulled out of the core 3 after being folded. Alternatively, the reinforcing jig 4 may have a frame structure without wall surfaces. The reinforcing jig 4 having a frame structure touches the core 3 at only the frame, and thus does not have to include the jet ports 4A for the fluid F.

However, the reinforcing jig 4 having a box structure including wall surfaces, as illustrated in FIG. 5, can support the inner side of the core 3 with the wall surfaces. This structure can reinforce the rigidity of the core 3 with the wall surfaces of the reinforcing jig 4 and can reduce the error of the shape of either one of the composite structure body O and the dry preform. When the reduction of the error of the shape of either one of the composite structure body O and the dry preform is regarded as important, the reinforcing jig 4 preferably has a box structure and the jet ports 4A appropriately formed in the wall surfaces of the reinforcing jig 4 to jet the fluid F.

After the reinforcing jig 4 is pulled out of the core 3, the core 3 needs to be pulled out of the hollow region R of either one of the composite structure body O and the dry preform. The core 3 is folded when being pulled out of the hollow region R of either one of the composite structure body O and the dry preform. Thus, the inside of the core 3 from which the reinforcing jig 4 is pulled out is subjected to vacuum bagging, and has a negative pressure with respect to the atmospheric pressure.

A second vacuum tube 21 is thus coupled to the core 3. The second vacuum tube 21 is a tube that discharges air from the inside of the core 3 to fold the core 3 inward when the core 3 is pulled out of the hollow region R of either one of the composite structure body O and the dry preform.

After the reinforcing jig 4 is pulled out of the core 3, the inside of the core 3 is coupled to the vacuum device 8 through the second vacuum tube 21 for vacuum bagging. Alternatively, a vacuum device different from the vacuum device 8 that bags either one of the composite structure body O and the dry preform may be used to perform vacuum bagging on the inside of the core 3.

When the same vacuum device 8 performs vacuum bagging on the inside of the core 3 and vacuum bagging on the region sealed in the bagging film 5, as illustrated in FIG. 1, the first stopcock 7A and a second stopcock 21A are respectively coupled to the first vacuum tube 7 and the second vacuum tube 21, so that the region that is to be subjected to vacuum bagging can be switched.

Figure 7:
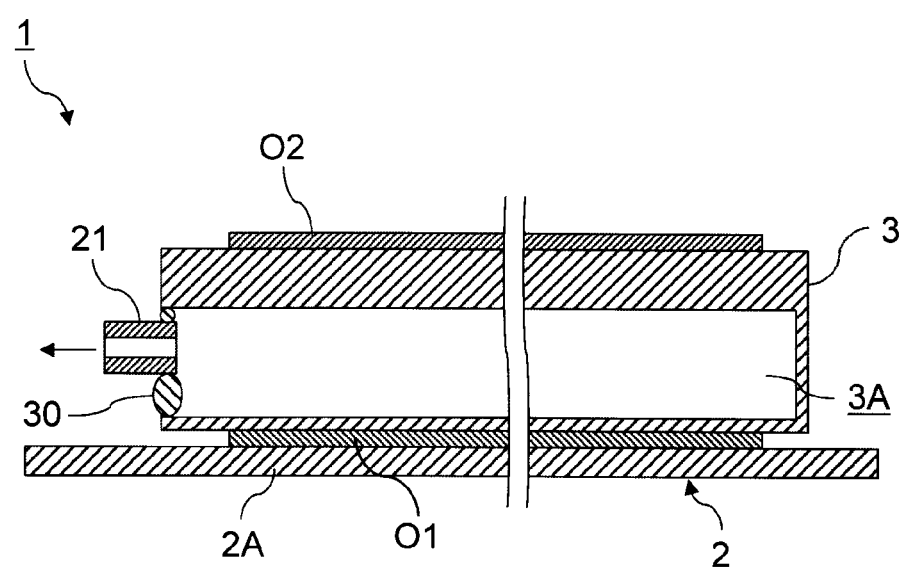
FIG. 7 is a vertical sectional view of a structure an end portions of the core when the core is pulled out of the composite structure body illustrated in FIG. 2.

FIG. 7 is a vertical sectional view of a structure at end portions of the core 3 when the core 3 is pulled out of the composite structure body O illustrated in FIG. 2.

To perform vacuum bagging on the inside of the core 3, the second vacuum tube 21 needs to be coupled to the core 3 while the open end of the core 3 into which and from which the reinforcing jig 4 is inserted and pulled out is closed. As illustrated in FIG. 7, for instance, the second vacuum tube 21 can be attached to the open end of the core 3 with a sealant 30. The sealant 30 can close the gap between the second vacuum tube 21 and the core 3.

Alternatively, for the core 3 having a large hole 3A, a closing member made of a thin flexible material may be attached to the open end of the core 3 with, for instance, the sealant 30 to close the open end of the core 3. In this case, the second vacuum tube 21 can be coupled to the closing member that closes the open end of the core 3.

As another structure example, the second vacuum tube 21 may be coupled to the open end of the core 3. In this case, the second vacuum tube 21 does not necessarily need to be attachable to and detachable from the core 3.

However, to jet the fluid F other than air from the jet ports 4A of the reinforcing jig 4, the positions of the jet ports 4A need to be appropriately determined so as not to allow the fluid F to flow into the second vacuum tube 21. In order to facilitate pullout of the reinforcing jig 4 with the fluid F jetted from the jet ports 4A of the reinforcing jig 4, the second vacuum tube 21 is preferably attachable to and detachable from the open end of the core 3, because it is effective to jet the fluid F into the inner surface of the open end of the core 3 and to apply the pressure of the fluid F in the longitudinal direction of the reinforcing jig 4 from the outside of the reinforcing jig 4.

When the core 3 protrudes from either one of the composite structure body O and the dry preform by a sufficiently large length from the side from which the core 3 is pulled out, the second vacuum tube 21 may be attachable to and detachable from a thick, hardly-deformable portion of the side surface of the core 3, instead of the end surface of the core 3.

The shape and the structure of the core 3 are described now.

Unlike a bladder bag having a uniform thickness, the hollow core 3 has a portion locally thinned to define a foldable portion. For instance, as illustrated in FIG. 2, to form the composite structure body O including the hat-shaped reinforcing member O2 attached to the panel O1, a bottom surface 3B of the core 3 that touches the panel O1 may have a smaller thickness than other portions. Thus, the bottom surface 3B of the core 3 can be folded by being bent inward.

Figure 8:
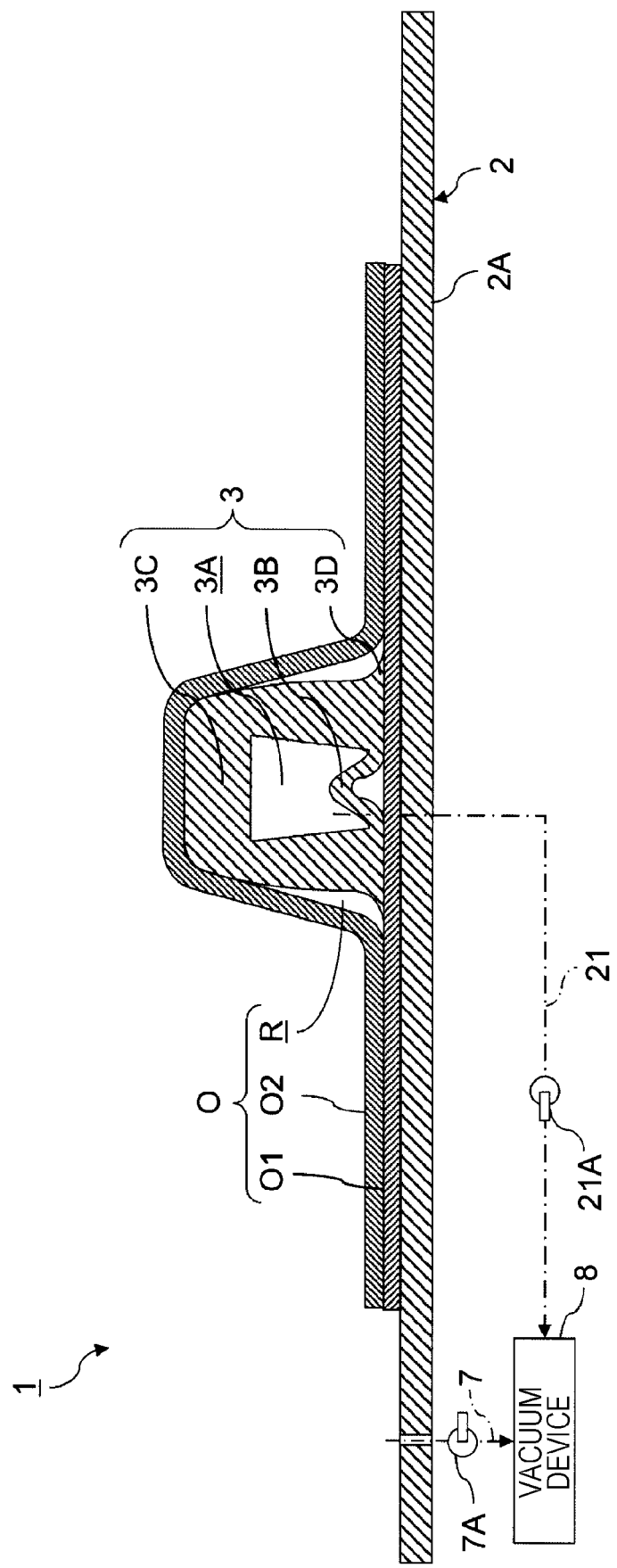
FIG. 8 is a cross-sectional view of the composite forming jig having the core illustrated in FIG. 1 in a folded state.
Figure 9:
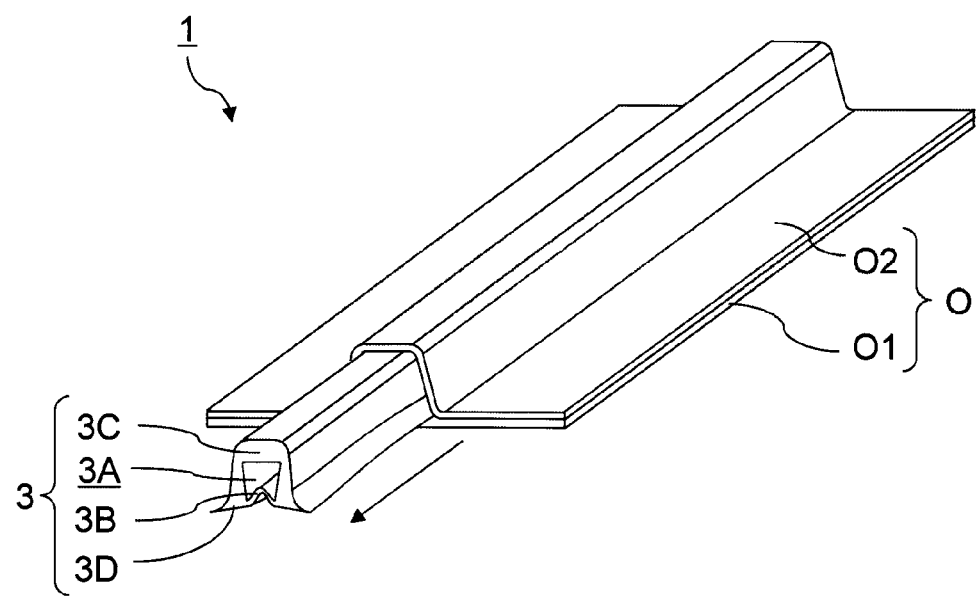
FIG. 9 is a perspective view of the state where the core of the composite forming jig illustrated in FIG. 1 is folded to be pulled out of the hollow region of the composite structure body illustrated in FIG. 2.

FIG. 8 is a cross-sectional view of the composite forming jig 1 having the core 3 illustrated in FIG. 1 in a folded state. FIG. 9 is a perspective view of the state where the core 3 of the composite forming jig 1 illustrated in FIG. 1 is folded and pulled out of the hollow region R of the composite structure body O illustrated in FIG. 2. FIG. 9 omits illustrations of the second vacuum tube 21 coupled to the open end of the core 3 and the sealant 30 that closes the gap between the core 3 and the second vacuum tube 21.

When the bottom surface 3B of the core 3 is folded inward by changing the pressure inside of the core 3, having a shape that fits the hollow region R between the hat-shaped reinforcing member O2 and the panel O1, to a negative pressure, gaps are formed between the core 3 and the composite structure body O, so that the core 3 can be easily pulled out of the hollow region R.

Conversely, the core 3 has a large thickness at a portion 3C, which supports, from the inner side of the reinforcing member O2, rounded portions of the hat-shaped reinforcing member O2 protruding in a direction away from the panel O1. Thus, the portion 3C that supports the rounded portions can reduce or eliminate the flexibility in the direction perpendicular to the longitudinal direction of the core 3. Specifically, the portion 3C serving as the upper wall of the core 3 that supports, from the inner side, the rounded portions on both sides of a cap portion of the hat-shaped reinforcing member O2 may have a larger thickness.

The portion 3C serving as the upper wall of the core 3 does not serve as a starting point of folding. Thus, only the bottom surface 3B can be selectively bent inward with the portion 3C serving as the upper wall of the core 3 being deformed as less as possible.

The hat-shaped reinforcing member O2 also includes rounded portions protruding toward the panel O1. Thus, each of the hollow regions R formed between the hat-shaped reinforcing member O2 and the panel O1 has a sharp narrow portion. Specifically, sharp narrow portions are formed between the panel O1 and the rounded portions of the reinforcing member O2 protruding toward the panel O1.

Accordingly, the core 3 also has sharp portions 3D, which support the sharp narrow portions from the inner side of the reinforcing member O2. The sharp portions 3D of the core 3 may be broken if dragged in the longitudinal direction of the core 3 while being in contact with the composite structure body O.

To avoid this, the core 3 has a small thickness at the bottom surface 3B facing the panel O1 to allow, when the core 3 is folded inward, the sharp portions 3D of the core 3, which support the rounded portions of the reinforcing member O2 protruding toward the panel O1 from the inner side of the reinforcing member O2, to slide over the surface of the panel O1 in the direction perpendicular to the longitudinal direction of the core 3.

Figure 10:
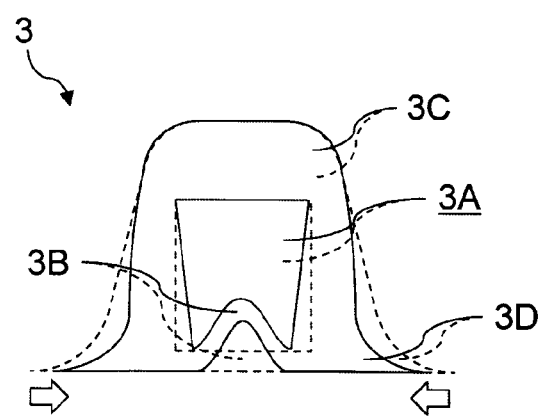
FIG. 10 is a cross-sectional view of the state where sharp portions of the core illustrated in FIG. 8 are slid over the surface of the panel in the direction perpendicular to the longitudinal direction of the core.

FIG. 10 is a cross-sectional view of the state where the sharp portions 3D of the core 3 illustrated in FIG. 8 are slid over the surface of the panel O1 in the direction perpendicular to the longitudinal direction of the core 3.

Before the entirety of the core 3 is pulled out of the composite structure body O in the longitudinal direction of the core 3, the sharp portions 3D of the core 3 can be spaced apart from the narrow portions in the direction perpendicular to the longitudinal direction of the core 3, as illustrated in FIG. 10.

The composite structure body O having the hollow regions R having sharp narrow portions, which have been difficult to form thus far, can thus be formed using the core 3 having the sharp portions 3D that fit the sharp narrow portions.

This holds true to the case of shaping a dry preform. Specifically, this structure can prevent the shaped dry preform from being deformed as a result of the sharp portions 3D of the core 3 that fit the sharp narrow portions of the dry preform being dragged while being in contact with the dry preform.

The above-described example has described the case where either one of the composite structure body O and the dry preform is disposed while either one of the reinforcing member O2 having a hat-shaped cross section and the fiber laminate for the reinforcing member O2 faces upward. Alternatively, either one of the composite structure body O and the dry preform may be disposed while either one of the reinforcing member O2 having a hat-shaped cross section and the fiber laminate for the reinforcing member O2 faces downward.

In that case, the surface of the lower die 2A has a shape having a recess that fits either one of the reinforcing member O2 having a hat-shaped cross section and the fiber laminate for the reinforcing member O2. Then, either one of the reinforcing member O2 and the fiber laminate for the reinforcing member O2 is disposed on the lower die 2A, and the core 3 is disposed on either one of the reinforcing member O2 and the fiber laminate for the reinforcing member O2. In addition, either one of the panel O1 and the fiber laminate for the panel O1 is disposed on either one of the reinforcing member O2 and the fiber laminate for the reinforcing member O2 on which the core 3 is mounted. Thus, the pressure difference between the atmospheric pressure and the pressure in the region covered with the bagging film 5 is applied to either one of the panel O1 and the fiber laminate for the panel O1 covered with the bagging film 5.

However, when the atmospheric pressure is applied to either one of the composite structure body O and the dry preform, the pressure is more uniformly applied and the structure of the lower die 2A is further simplified when either one of the fairly flat panel O1 and the fiber laminate for the panel O1 is supported by the lower die 2A and the atmospheric pressure is applied to either one of the fairly uneven reinforcing member O2 and the fiber laminate for the reinforcing member O2.

As illustrated in FIG. 1 and FIG. 3, preferably, either one of the composite structure body O and the dry preform is manufactured while either one of the panel O1 and the fiber laminate for the panel O1 is disposed vertically downward, and either one of the reinforcing member O2 and the fiber laminate for the reinforcing member O2 is disposed vertically upward.

On the other hand, when the forming die 2 includes an upper die and a lower die, and the upper die and the lower die apply pressure on either one of the composite structure body O and the dry preform from both upper and lower sides, the same effects are obtained whichever direction either one of the composite structure body O and the dry preform faces.

Now, other structure examples of either one of the composite structure body O and the dry preform having a hollow region R manufacturable by the composite forming jig 1 are described.

Figure 11:
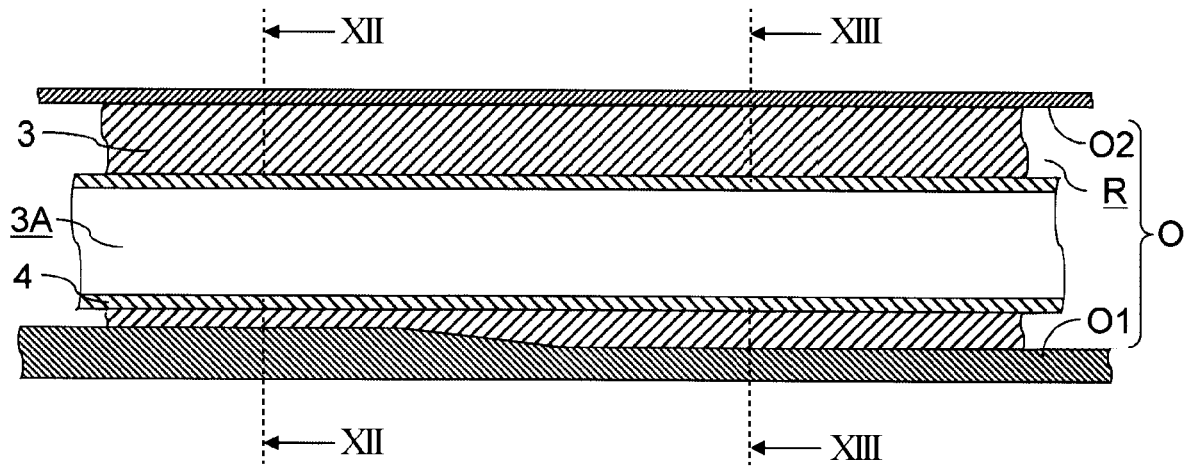
FIG. 11 is a vertical sectional view of an example where the core is disposed in the hollow region of the composite structure body including a panel having an uneven thickness and a reinforcing member having a hat-shaped cross section and attached to the panel.
Figure 12:
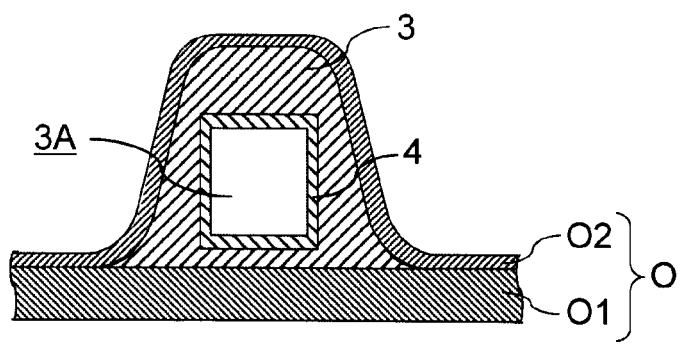
FIG. 12 is a cross-sectional view of the composite structure body and the core taken along line XII-XII of FIG. 11.
Figure 13:
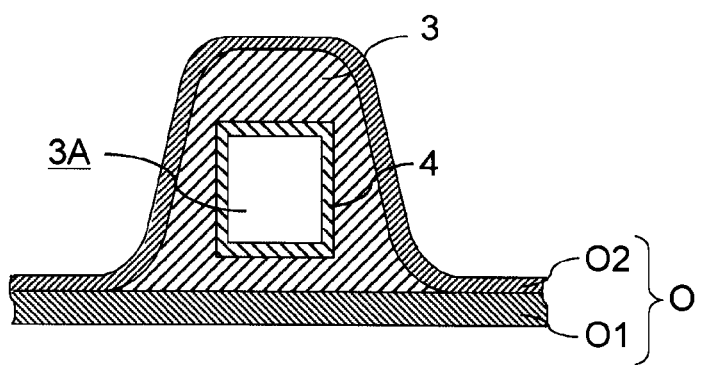
FIG. 13 is a cross-sectional view of the composite structure body and the core taken along line XIII-XIII of FIG. 11.

FIG. 11 is a vertical sectional view of an example where the core 3 is disposed in the hollow region R of the composite structure body O including the panel O1 having an uneven thickness and the reinforcing member O2 having a hat-shaped cross section and attached to the panel O1. FIG. 12 is a cross-sectional view of the composite structure body O and the core 3 taken along line XII-XII of FIG. 11. FIG. 13 is a cross-sectional view of the composite structure body O and the core 3 taken along line XIII-XIII of FIG. 11.

When the composite structure body O including the panel O1 to which the reinforcing member O2 is attached is for an aircraft structure body, the reinforcing member O2 of the panel O1 may have a stepped portion. In this case, the thickness of the panel O1 is varied. When the direction in which the thickness of the panel O1 is varied coincides with the longitudinal direction of the reinforcing member O2, the height of the reinforcing member O2 is varied. The cross-sectional shape of the hollow region R is thus uneven.

Even in this case, the core 3 can be pulled out of the hollow region R when the hollow region R has such a shape that the width of the core 3 is equal to or smaller than the width of the hollow region R at any point of the hollow region R while the core 3 is in the folded state. Thus, even the composite structure body O having the hollow region R having an uneven cross-sectional shape can be manufactured with the core 3 having the contour that fits the hollow region R.

As illustrated, when the reinforcing jig 4 is inserted into the hole 3A of the core 3, it is appropriate that the core 3 has a hole 3A having either one of a uniform cross section and a tapered cross section to facilitate pullout of the reinforcing jig 4 from the core 3. In the illustrated example, as in the example illustrated in FIG. 1, the tubular reinforcing jig 4 having a rectangular cross section is inserted into the hole 3A of the core 3 having a rectangular cross section.

This naturally holds true to the case of shaping a dry preform.

Figure 14:
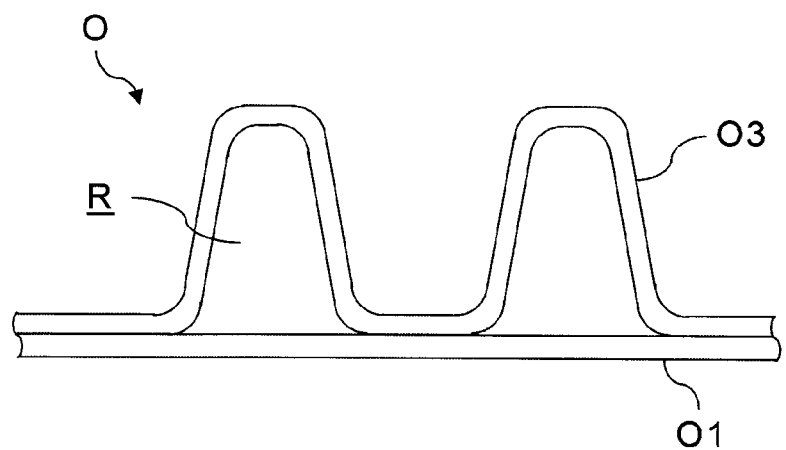
FIG. 14 is a front view of another structure example of a composite structure body having hollow regions manufacturable by the composite forming jig illustrated in FIG. 1.

FIG. 14 is a front view of another structure example of a composite structure body O having hollow regions R manufacturable by the composite forming jig 1 illustrated in FIG. 1.

As illustrated in FIG. 14, either one of the composite structure body O including the panel O1 and a reinforcing member O3 having a corrugated cross section and attached to the panel O1 and a dry preform for the composite structure body O including the panel O1 and the reinforcing member O3 having a corrugated cross section and attached to the panel O1 serves as either one of the composite structure body O and the dry preform having multiple hollow regions R.

Thus, either one of the composite structure body O and the dry preform having multiple hollow regions R can be manufactured using the composite forming jig 1 including multiple cores 3. Specifically, either one of the composite structure body O including the panel O1 and the reinforcing member O3 attached to the panel O1 and the dry preform for the composite structure body O including the panel O1 and the reinforcing member O3 attached to the panel O1 can be manufactured using multiple cores 3 having a shape that fits the hollow regions R between the corrugated reinforcing member O3 and the panel O1.

The composite structure body O including the panel O1 and the reinforcing member O3 having a corrugated cross section and attached to the panel O1 has a structure in which multiple composite structure bodies O, each of which includes the panel O1 and the reinforcing member O2 having a hat-shaped cross section and attached to the panel O1, are coupled together. Thus, each of the cores 3 disposed in the hollow region R between the corrugated reinforcing member O3 and the panel O1 can have a shape and a structure the same as those of the case for manufacturing either one of the composite structure body O including the panel O1 and the reinforcing member O2 having a hat-shaped cross section and attached to the panel O1 and a dry preform for the composite structure body O including the panel O1 and the reinforcing member O2 having a hat-shaped cross section and attached to the panel O1.

Figure 15:
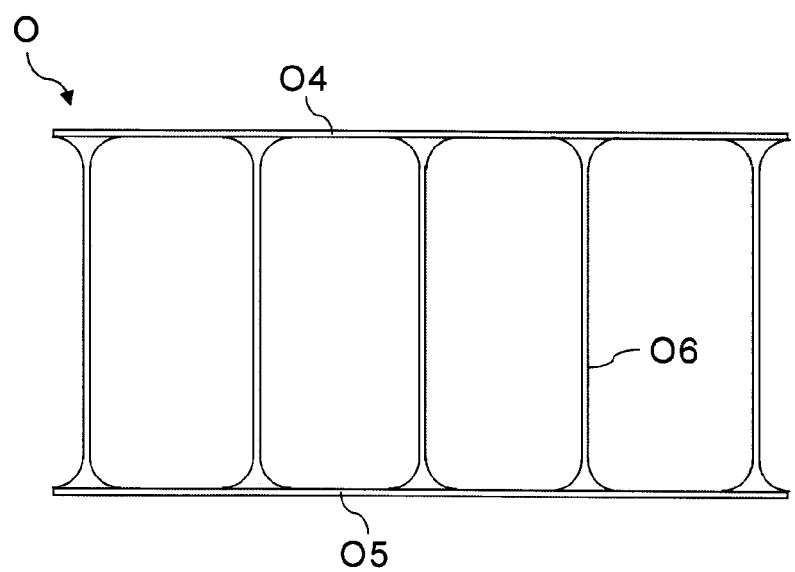
FIG. 15 is a front view of another structure example of a composite structure body having hollow regions manufacturable by the composite forming jig illustrated in FIG. 1.

FIG. 15 is a front view of another structure example of a composite structure body O having hollow regions R manufacturable by the composite forming jig 1 illustrated in FIG. 1.

As illustrated in FIG. 15, either one of the composite structure body O including an upper panel O4 and a lower panel O5 coupled together with multiple reinforcing members O6 and a dry preform for the composite structure body O including an upper panel O4 and a lower panel O5 coupled together with multiple reinforcing members O6 serves as either one of the composite structure body O and the dry preform having multiple hollow regions R.

Thus, either one of the composite structure body O and the dry preform having multiple hollow regions R can be manufactured using the composite forming jig 1 including multiple cores 3. Specifically, either one of the composite structure body O including the upper panel O4 and the lower panel O5 coupled together with multiple reinforcing members O6 and the dry preform for the composite structure body O including the upper panel O4 and the lower panel O5 coupled together with multiple reinforcing members O6 can be manufactured using multiple cores 3 having a shape that fits the hollow regions R between the upper panel O4, the lower panel O5, and the multiple reinforcing members O6.

The composite structure body O having a structure illustrated in any one of FIG. 2, FIG. 11, FIG. 14, and FIG. 15 can be employed as either one of a wing structure body and a fuselage structure body of an aircraft. When the composite structure body O serves as an aircraft structure body, any of spars, ribs, and stringers, serving as reinforcing members O2, O3, and O6, are attached to any one of the panel O1, the upper panel O4, and the lower panel O5.

Besides the above-described examples, either one of the composite structure body O of any of various shapes and a dry preform for the composite structure body O having a hollow region R can be manufactured using the composite forming jig 1 including the forming die 2 and the core 3. Specifically, a tubular composite structure body O can be also manufactured using the core 3 having a shape that fits the shape of the hollow region R of the composite structure body O. An arcuately-curved tubular composite structure body O having a uniform curvature, which can be pulled out of the core 3, can be also manufactured.

The thin portion of the core 3 may be located at any position in accordance with the shape of the hollow region R. For instance, a tubular core 3 having a rectangular hole 3A may have a thin portion in any of the upper surface and a left and right wall surfaces. Alternatively, the core 3 may have a portion locally thinned with either one of a cut and groove having a length in the longitudinal direction of the core 3.

Figure 16:
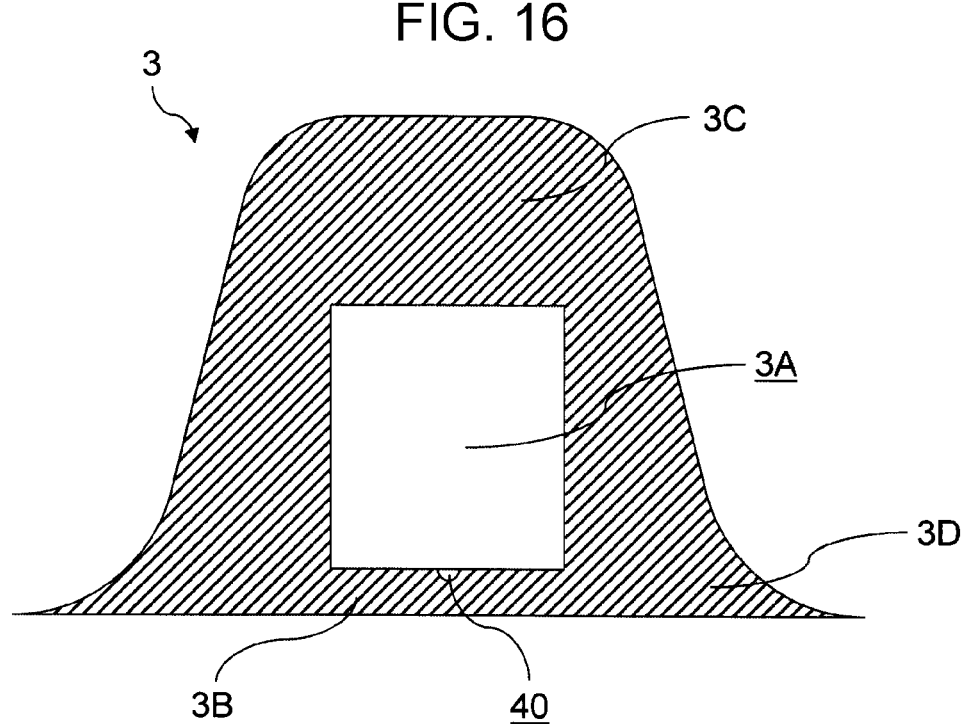
FIG. 16 is a cross-sectional view of an example of a core having a portion locally thinned with a groove in the bottom surface of the core illustrated in FIG. 1.
Figure 17:
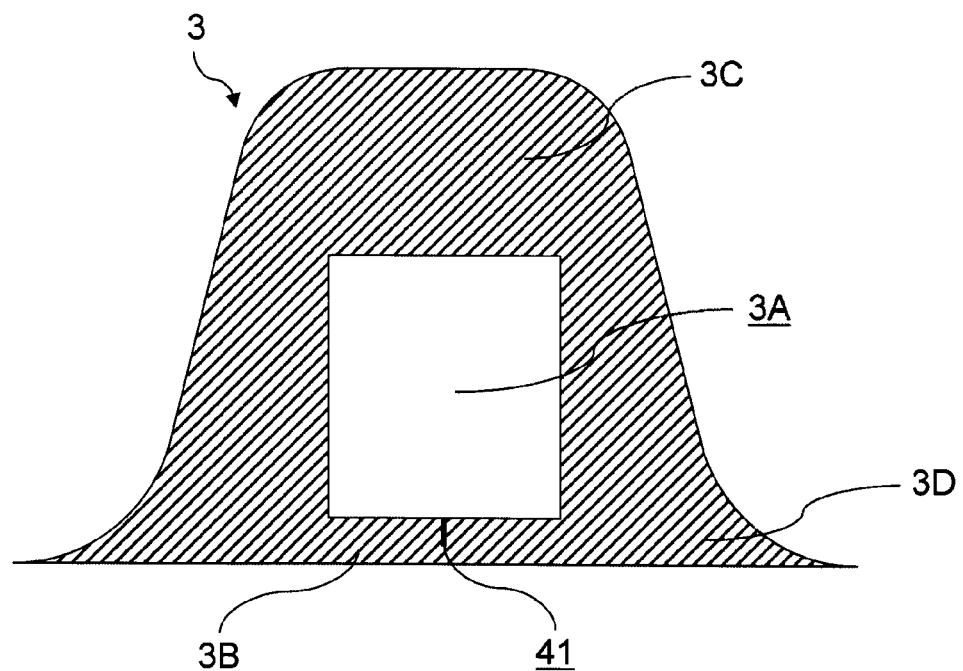
FIG. 17 is a cross-sectional view of an example of a core having a portion locally thinned with a cut in the bottom surface of the core illustrated in FIG. 1.

FIG. 16 is a cross-sectional view of an example of the core 3 having a portion locally thinned with a groove 40 in the bottom surface 3B of the core 3 illustrated in FIG. 1. FIG. 17 is a cross-sectional view of an example of the core 3 having a portion locally thinned with a cut 41 in the bottom surface 3B of the core 3 illustrated in FIG. 1.

As illustrated in either one of FIG. 16 and FIG. 17, forming either one of the groove 40 and the cut 41 in the core 3 more reliably defines the position at which the core 3 starts being deformed.

Composite Forming Method Using Composite Forming Jig

Now, a composite forming method using the composite forming jig 1 is described. The following describes the case, for instance, where the composite structure body O having a structure including the panel O1 and the reinforcing member O2 having a hat-shaped cross section and attached to the panel O1 is to be manufactured, as illustrated in FIG. 2. The composite structure body O including the panel O1 and the reinforcing member O3 having a corrugated cross section and attached to the panel O1 can be also manufactured with, by changing only the number of cores 3, substantially the same procedure as that for the composite structure body O including the panel O1 and the reinforcing member O2 having a hat-shaped cross section and attached to the panel O1.

Figure 18:
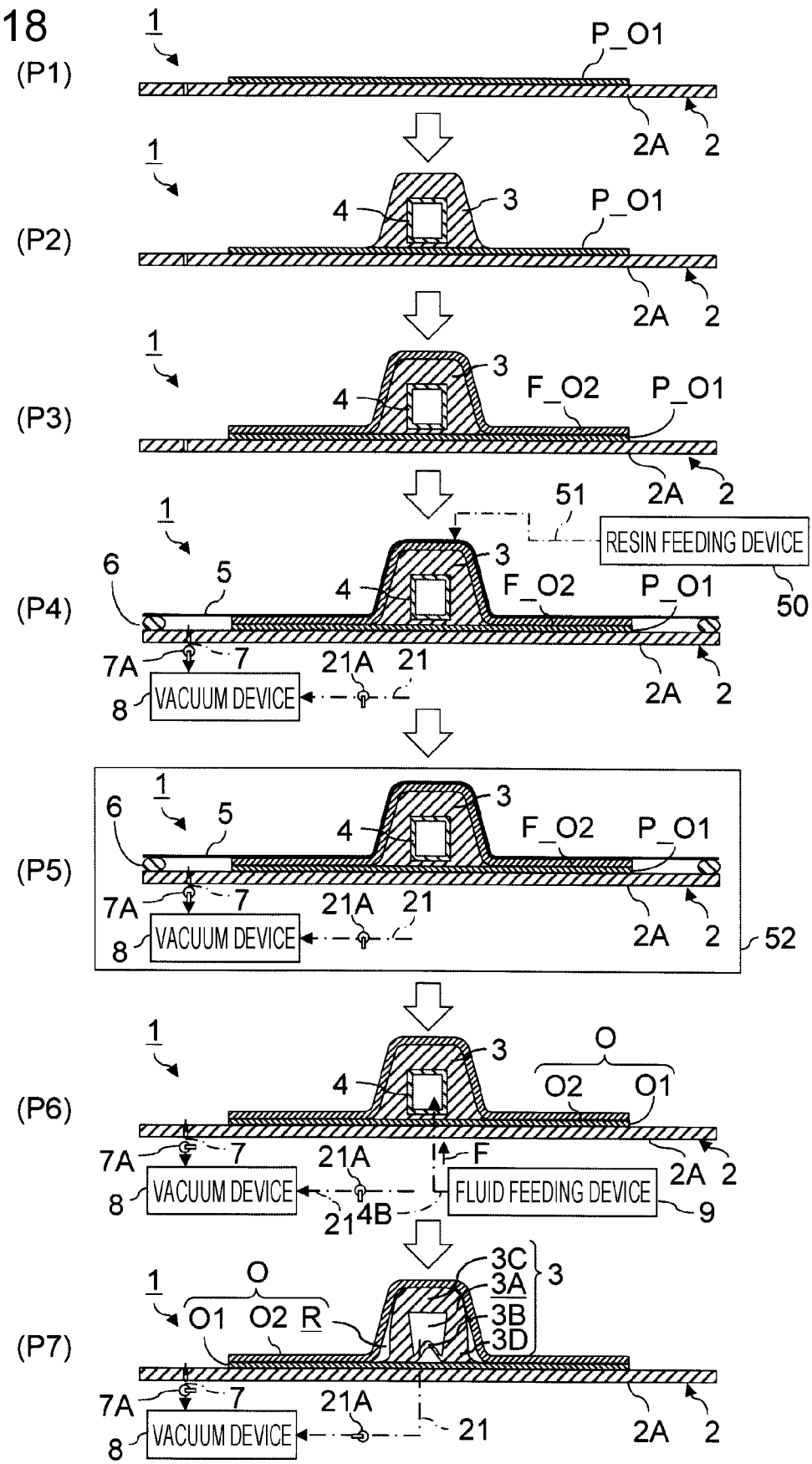
FIG. 18 illustrates an operation flow for manufacturing a composite structure body by a hybrid method using the composite forming jig illustrated in FIG. 1.

FIG. 18 illustrates an operation flow for manufacturing the composite structure body O by a hybrid method using the composite forming jig 1 illustrated in FIG. 1.

In step P1, first, prepregs for the panel O1 are laminated on the lower die 2A. Thus, a prepreg laminate P_O1 for the panel O1 is manufactured.

Subsequently, in step P2, the core 3 is mounted on the prepreg laminate P_O1 for the panel O1. Specifically, the core 3 is disposed at a portion that forms the hollow region R between the reinforcing member O2 and the panel O1. Here, to retain the linearity of the core 3 and the hollow region R, the rigid reinforcing jig 4 is preferably inserted into the core 3, as illustrated, before the core 3 is disposed at the portion that forms the hollow region R.

Subsequently, in step P3, a fiber sheet for the hat-shaped reinforcing member O2 is laminated on the prepreg laminate P_O1 for the panel O1 on which the core 3 is mounted. Thus, a fiber laminate F_O2 for the hat-shaped reinforcing member O2 is manufactured. Alternatively, a dry preform having a hat-shaped cross section shaped by another shaping jig may be mounted on the prepreg laminate P_O1 for the panel O1 on which the core 3 is mounted.

Subsequently, in step P4, the prepreg laminate P_O1 for the panel O1 and the fiber laminate F_O2 for the hat-shaped reinforcing member O2 are bagged, and the fiber laminate F_O2 for the hat-shaped reinforcing member O2 is impregnated with resin.

Specifically, the prepreg laminate P_O1 for the panel O1 and the fiber laminate F_O2 for the reinforcing member O2 are sealed in the bagging film 5. Then, as illustrated in FIG. 1, the first stopcock 7A is opened, and the region sealed in the bagging film 5 is coupled to the vacuum device 8 with the first vacuum tube 7.

Subsequently, the vacuum device 8 is activated to perform vacuum bagging on the region sealed in the bagging film 5. Thus, air is discharged from the region sealed in the bagging film 5, and the prepreg laminate P_O1 for the panel O1 and the fiber laminate F_O2 for the reinforcing member O2 finish being bagged.

On the other hand, a resin feeding device 50 is coupled to the region sealed in the bagging film 5 with a resin feeding tube 51. The resin feeding tube 51 can be coupled to, for instance, a mouthpiece attached to the bagging film 5. Then, while the vacuum device 8 is performing vacuum bagging, uncured thermosetting resin is injected into the region sealed in the bagging film 5. Thus, the fiber laminate F_O2 for the reinforcing member O2 can be impregnated with the uncured thermosetting resin.

Normally, resin is heated to flow smoothly. Thus, a heating device may be installed in the lower die 2A so that the resin has an appropriate temperature not to fail in flowing smoothly.

Subsequently, in step P5, while the vacuum device 8 is performing vacuum bagging, the fiber laminate F_O2 for the reinforcing member O2 impregnated with uncured resin and the prepreg laminate P_O1 for the panel O1 are heat-cured. Specifically, the fiber laminate F_O2 for the reinforcing member O2 impregnated with resin and the prepreg laminate P_O1 for the panel O1 are heated by a heating device 52 to the temperature at which the resin cures.

After the fiber laminate F_O2 for the reinforcing member O2 impregnated with resin and the prepreg laminate P_O1 for the panel O1 are completely heat-cured, the composite structure body O having the hollow region R can be manufactured. Specifically, the composite structure body O having the hollow region R and including the panel O1 and the hat-shaped reinforcing member O2 attached to the panel O1, as illustrated in FIG. 2, can be manufactured by disposing the core 3 having the shape that fits the hollow region R between the hat-shaped reinforcing member O2 and the panel O1 at the portion that forms the hollow region R.

After manufacturing of the composite structure body O is finished, the first stopcock 7A is closed and the region sealed in the bagging film 5 is released to the atmosphere. Then, the composite structure body O needs to be removed from the composite forming jig 1. To this end, the core 3 needs to be folded inward to be pulled out of the hollow region R of the composite structure body O. Here, the rigid reinforcing jig 4 is inserted into the hole 3A of the core 3.

Thus, in step P6, before the core 3 is folded inward, the reinforcing jig 4 is pulled out of the core 3. The core 3 is made of rubber having a large coefficient of linear expansion, whereas the reinforcing jig 4 is made of either one of CFRP and a metal having a small coefficient of linear expansion. Thus, the reinforcing jig 4 can be pulled out of the core 3 using the gap between the reinforcing jig 4 and the core 3 caused due to the difference in coefficient of thermal expansion.

In addition, the fluid F can be supplementally injected into the reinforcing jig 4 and jetted from the jet ports 4A in the reinforcing jig 4. In this case, the fluid feeding tube 4B is coupled to the end portion from which the reinforcing jig 4 is pulled out. The fluid feeding tube 4B is coupled to a fluid feeding device 9, such as a compressed air cylinder, a water tank, or a lubricant feeding tank.

As described with reference to FIGS. 6A, 6B, and 6C, when the fluid F is injected into the reinforcing jig 4 and jetted from the jet ports 4A of the reinforcing jig 4, the gap between the reinforcing jig 4 and the core 3 can be enlarged further. Thus, the reinforcing jig 4 can be pulled out of the core 3 more easily.

Subsequently, in step P7, air is discharged from the inside of the core 3 from which the reinforcing jig 4 is pulled out.

To this end, the open end of the core 3 is closed and the second vacuum tube 21 is coupled to the core 3. Then, the second stopcock 21A is opened, and the inside of the core 3 is coupled to the vacuum device 8 with the second vacuum tube 21. Subsequently, the vacuum device 8 is activated to discharge air from the inside of the core 3. Thus, the core 3 having a negative pressure inside can be folded inward. Consequently, the core 3 thinned further than the hollow region R of the composite structure body O can be easily pulled out of the hollow region R.

Particularly, the core 3 has the bottom surface 3B thinned further than other portions. The portion 3C of the core 3 that supports the rounded portions of the reinforcing member O2 on both sides of the cap portion from the inside is thick. Thus, the bottom surface 3B of the core 3 is raised and folded inward to allow the sharp portions 3D of the core 3, which support, from the inner side of the reinforcing member O2, the sharp narrow portions near the portions at which the reinforcing member O2 and the panel O1 overlap, to slide over the surface of the panel O1 in the direction perpendicular to the longitudinal direction of the core 3. Consequently, the core 3 can be smoothly pulled out of the hollow region R of the composite structure body O while the sharp portions 3D of the core 3 are in contact with the reinforcing member O2 and the panel O1 in the narrow portions without being dragged in the longitudinal direction of the core 3.

Subsequently, another example of a method for manufacturing a composite structure body O including the composite forming jig 1 is described.

FIG. 19 illustrates an operation flow for manufacturing a composite structure body O by laminating prepregs using the composite forming jig 1 illustrated in FIG. 1 and heat-curing the prepreg laminate. The steps the same as those illustrated in FIG. 18 are denoted by the same reference signs and not described in detail.

In step P1, first, prepregs for the panel O1 are laminated on the lower die 2A to manufacture a prepreg laminate P_O1 for the panel O1. Subsequently, in step P2, the core 3 into which the rigid reinforcing jig 4 is inserted is mounted on the prepreg laminate P_O1 for the panel O1.

Subsequently, in step P10, prepregs for the reinforcing member O2 are laminated on the prepreg laminate P_O1 for the panel O1 on which the core 3 is mounted. Thus, the prepreg laminate P_O2 for the reinforcing member O2 is mounted on the prepreg laminate P_O1 for the panel O1. Consequently, the core 3 is disposed in the hollow region R between the prepreg laminate P_O1 for the panel O1 and the prepreg laminate P_O2 for the reinforcing member O2, and the prepreg laminate P_O2 for the reinforcing member O2 is supported by the core 3.

Subsequently, in step P11, the prepreg laminate P_O1 for the panel O1 and the prepreg laminate P_O2 for the reinforcing member O2 are bagged.

Specifically, the prepreg laminate P_O1 for the panel O1 and the prepreg laminate P_O2 for the reinforcing member O2 are sealed in the bagging film 5. Then, as illustrated in FIG. 1, the first stopcock 7A is opened to couple the region sealed in the bagging film 5 to the vacuum device 8 with the first vacuum tube 7.

Subsequently, the vacuum device 8 is activated to perform vacuum bagging on the region sealed in the bagging film 5. Thus, air is discharged from the region sealed in the bagging film 5, and the prepreg laminate P_O1 for the panel O1 and the prepreg laminate P_O2 for the reinforcing member O2 finish being bagged.

Subsequently, in step P5, while the vacuum device 8 is performing vacuum bagging, the prepreg laminate P_O1 for the panel O1 and the prepreg laminate P_O2 for the reinforcing member O2 are heat-cured. Specifically, the prepreg laminate P_O1 for the panel O1 and the prepreg laminate P_O2 for the reinforcing member O2 are heated by the heating device 52 to the temperature at which the resin cures. Thus, the composite structure body O having the hollow region R and including the panel O1 and the hat-shaped reinforcing member O2 attached to the panel O1, as illustrated in FIG. 2, can be manufactured.

Subsequently, in step P6, the reinforcing jig 4 is pulled out of the inside of the core 3. Thus, as needed, the reinforcing jig 4 is coupled to the fluid feeding device 9 with the fluid feeding tube 4B to allow the fluid feeding device 9 to jet the fluid F from the jet ports 4A of the reinforcing jig 4.

Subsequently, in step P7, the inside of the core 3 is coupled to the vacuum device 8 with the second vacuum tube 21, so that air is discharged from the inside of the core 3 by vacuum bagging. Thus, the core 3 is folded inward. Then, the core 3 thinned further than the hollow region R of the composite structure body O is pulled out of the hollow region R. In this manner, the composite structure body O having the hollow region R can be removed from the composite forming jig 1.

Effects

In the above-described composite forming jig 1 and with the composite forming method, the rubber-made core 3 with the hole 3A is deformable with the pressure inside being changed to a negative pressure.

In the composite forming jig 1 and with the composite forming method, the core 3 can be easily pulled out of the hollow region R after either one of the composite structure body O and the dry preform having the hollow region R is formed. Even the hollow and rubber-made core 3 can securely retain the shape of either one of the composite structure body O and the dry preform with the rigid reinforcing jig 4 being inserted into the rubber-made core 3.

In addition, varying the thickness of the core 3 enables the core 3 to be deformed at a specific position. Specifically, the direction in which the core 3 is deformed can be controlled. Thus, the composite structure body O having sharp hollow regions R can be also pulled out of the hollow region R after the core 3 is temporarily spaced apart from the sharp portions. Thus, the composite structure body O having the sharp hollow regions R, which has been difficult to form, can be easily manufactured.

Second Implementation

Figure 20:
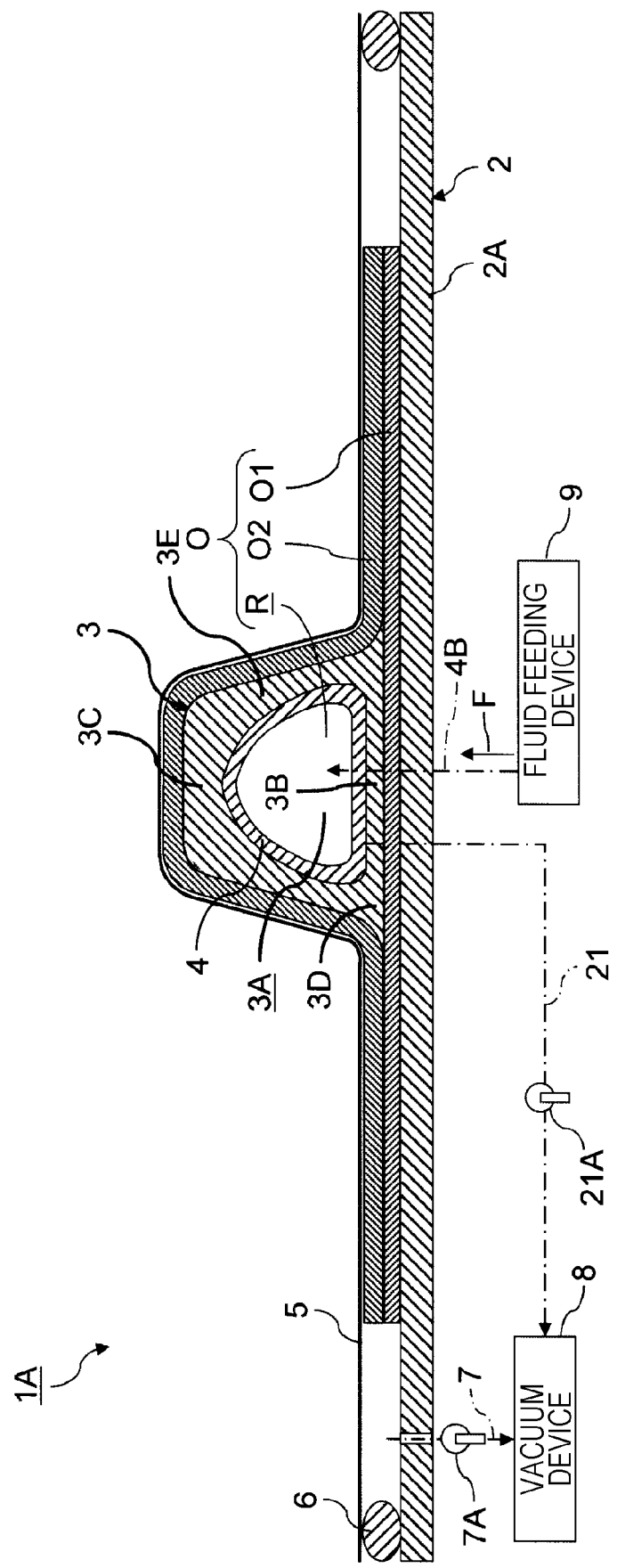
FIG. 20 is a cross-sectional view of components of a composite forming jig according to a second implementation of the present invention.

FIG. 20 is a cross-sectional view of components of a composite forming jig according to a second implementation of the present invention.

A composite forming jig 1A according to the second implementation illustrated in FIG. 20 differs from the composite forming jig 1 according to the first implementation in terms of the cross-sectional shape of the core 3. Other components and functions of the composite forming jig 1A according to the second implementation are substantially the same as those of the composite forming jig 1 according to the first implementation. Thus, the same and corresponding components are denoted with the same reference signs and not described below.

The core 3 having the rectangular hole 3A, illustrated as an example in the first example, may increase its height when having its pressure inside changed to a negative pressure, and may be pressed against the hat-shaped reinforcing member O2.

Figure 21:
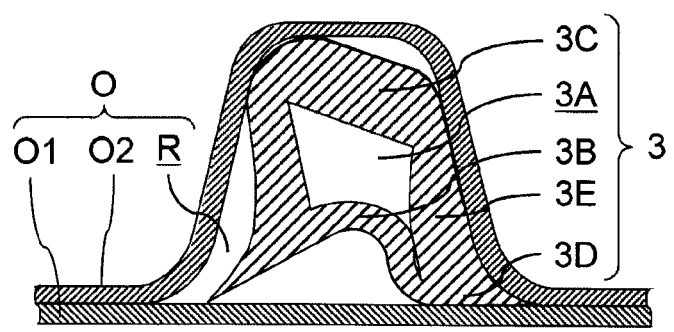
FIG. 21 is a cross-sectional view of an example of a failure that can occur when a core having a hole having a simple rectangular cross section as illustrated in FIG. 1 is folded inward.

FIG. 21 is a cross-sectional view of an example of a failure that can occur when the core 3 having a hole 3A having a simple rectangular cross section as illustrated in FIG. 1 is folded inward.

When the hole 3A of the core 3 has a rectangular cross-sectional shape, the core 3 has a substantially box-shaped structure. Specifically, the portion 3C, which supports, from the inner side of the reinforcing member O2, the rounded portions of the reinforcing member O2 protruding away from the panel O1, serves as an upper wall, and the portions connecting, on both sides, the portion 3C supporting the rounded portions of the reinforcing member O2 to the bottom surface 3B of the core 3 serve as left and right side walls 3E.

When the core 3 has its cross-sectional contour determined to fit the hollow region R between the hat-shaped reinforcing member O2 and the panel O1, two portions at which the portion 3C serving as the upper wall and the left and right side walls 3E cross each other locally have small thicknesses.

Thus, when the core 3 has a negative pressure inside, the core 3 may be deformed into a rhombus at the corner portions, serving as fulcrums, at which the portion 3C serving as the upper wall and the left and right side walls 3E cross each other, as illustrated in FIG. 21 in an exaggerated manner. In this case, the core 3 has its height increased more than before being folded, so that the core 3 may come into contact with the reinforcing member O2 to be less easily pulled out.

To address this, the cross-sectional shape of the core 3 is preferably determined to be reliably reduced in height, that is, to be reliably thinned further than the hollow region R when the core 3 has a negative pressure inside.

Specifically, as illustrated in FIG. 20, a bottom surface 3B that comes into contact with the panel O1 has a relatively small thickness to be flexible enough to be foldable inward at one point when air is discharged from the inside of the core 3, whereas the portion 3C of the upper wall that supports the rounded portions of the reinforcing member O2 has a large thickness to have less or no flexibility, as illustrated in FIG. 8. In addition, preferably, the core 3 has a hole 3A with a cross-sectional shape other than a polygon having more than or equal to four apexes. This holds true to the case where the inner surface of the hole 3A of the core 3 is rounded.

This structure can prevent the wall surfaces defining the core 3 from tilting. Preferably, the inner surface of the hole 3A of the core 3 is curved without an angle to avoid unnecessary stress concentration that can cause unintended deformation of the core 3 and to facilitate pullout of the reinforcing jig 4 from the core 3. Thus, the hole 3A of the core 3 may have a cross-sectional shape similar to the cross-sectional shape obtained by chamfering such as rounding apexes of a triangle, as illustrated in FIG. 20, or the cross-sectional shape obtained by chamfering corners of a horseshoe shape.

The cross-sectional contour of the core 3 is determined to fit the hat-shaped reinforcing member O2. Thus, when the hole 3A of the core 3 has a cross-sectional shape that is curved toward the cap portion of the reinforcing member O2, two portions at which the portion 3C serving as the upper wall of the core 3 and the left and right side walls 3E cross each other inevitably have a large thickness. This structure can thus restrict deformation of the core 3 to such a minimum necessary extent as to raise the bottom surface 3B inward.

FIG. 22 is a cross-sectional view of the state where the core 3 illustrated in FIG. 20 is folded inward.

When the core 3 having the cross-sectional shape illustrated in FIG. 20 has its pressure inside changed to a negative pressure to be deformed, the core 3 is deformed as little as possible except for inward deformation of the bottom surface 3B, as illustrated in FIG. 22. Particularly, the core 3 can be prevented from being deformed to have its cross-sectional width increased.

Thus, while the core 3 has its bottom surface 3B folded inward, the width of the core 3 can be made smaller than the width of the hollow region R. Particularly, while the bottom surface 3B of the core 3 is folded inward, the height of the core 3 can be reliably prevented from reaching or exceeding the height of the hollow region R.

To make the width of the core 3 smaller than the width of the hollow region R while the bottom surface 3B of the core 3 is folded inward, regardless of whether the hole 3A of the core 3 has a rectangular cross-sectional shape as illustrated in FIG. 8 or a curved cross-sectional shape as illustrated in FIG. 20, it is important to keep the inwardly bent bottom surface 3B apart from the other portions including the portion 3C serving as the upper wall of the core 3 and the left and right side walls 3E. This is because the core 3 is unintendedly deformed at portions with which the core 3 comes into contact.

To keep the inwardly bent bottom surface 3B apart from other portions of the core 3, the cross-sectional shape of the hole 3A of the core 3 needs to be determined appropriately. In other words, if the hole 3A of the core 3 has a sufficiently large cross section to keep the inwardly bent bottom surface 3B apart from other portions of the core 3, the width of the core 3 can be made smaller than the width of the hollow region R while the bottom surface 3B of the core 3 is folded inward.

This holds true not only to the case of manufacturing either one of a composite structure body O including the panel O1 and either one of the hat-shaped reinforcing member O2 and the corrugated reinforcing member O3, illustrated in FIG. 14, attached to the panel O1, and a dry preform for the composite structure body O. Specifically, if the core 3 has a thin portion at one point at which it is folded inward with discharge of air from the inside of the core 3, and a gap inside the core 3 has a cross section having a size determined so that the thin portion of the core 3 is kept apart from other portions of the core 3 while the thin portion is folded inward, the width of the core 3 in the direction perpendicular to the longitudinal direction can be made smaller than the width of the hollow region R of either one of the composite structure body O and the dry preform having an intended shape while the thin portion of the core 3 is folded inward.

In the above-described composite forming jig 1A according to the second implementation, the width of the core 3 can be more reliably made smaller than the width of the hollow region R by suitably changing the cross-sectional shape of the hole 3A of the core 3. In the second implementation, the core 3 can thus be more easily pulled out of either one of the composite structure body O and the dry preform after either one of the composite structure body O and the dry preform is manufactured. Conversely, the composite structure body O can be designed more freely.

Other Implementations

Although specific implementations have been described above, the implementations described are mere examples and do not limit the scope of the invention. New methods and new devices described herein can be embodied in various other forms. In the methods and the devices described herein, some components may be omitted, replaced, or changed in various different manners within the scope not departing from the gist of the invention. The scope of appended claims and the equivalents, included in the scope of claims and the summary of the invention, include such various different forms and modification implementations.

The invention claimed is:

1. A composite forming method, comprising:
   manufacturing a composite structure body having a hollow region by disposing a rubber-made core having a tubular structure at a portion that forms the hollow region of the composite structure body, the core having a thickness varied in a direction perpendicular to a longitudinal direction of the core to be foldable inward at a thin portion;
   pulling the core out of the hollow region by folding the core inward with air being discharged from an inside of the core after the composite structure body is manufactured;
   inserting a reinforcing jig into the core before the core is disposed at the portion that forms the hollow region; and
   heating the composite structure body to cure the composite structure body while the reinforcing jig is inserted into the core,
   wherein the reinforcing jig includes a metal or carbon fiber reinforced plastics.

2. The composite forming method according to claim 1, further comprising:
   pulling the reinforcing jig out of the core before the core is folded inward,
   wherein the reinforcing jig has a tubular shape or a stick shape.

3. The composite forming method according to claim 1, wherein the composite structure body comprises:
   a panel attached to a reinforcing member having either a hat-shaped cross section or a corrugated cross section; or
   a composite structure body comprising an upper panel and a lower panel coupled together with a plurality of reinforcing members;
   or a tubular composite structure body.

4. The composite terming method according to claim 3, wherein the composite structure body comprises the panel attached to the reinforcing member having either the hat-shaped cross section or the corrugated cross section and the core has a shape that fits a hollow region between the reinforcing member and the panel.

5. The composite forming method according to claim 4, wherein the core has a large thickness at a portion that supports, from an inner side of the reinforcing member, a rounded portion of the reinforcing member protruding in a direction away from the panel, and the portion that supports the rounded portion reduces or eliminates flexibility in the direction perpendicular to the longitudinal direction of the core.

6. The composite forming method according to claim 4, wherein a sharp portion of the core supports, from an inner side of the reinforcing member, a rounded portion of the reinforcing member protruding toward the panel, and is configured to slide over a surface of the panel in the direction perpendicular to the longitudinal direction of the core when the core having the thin portion near the panel is folded inward.

7. The composite forming method according to claim 4, further comprising:
   manufacturing a prepreg laminate for the panel;
   mounting the core on the prepreg laminate for the panel;
   laminating prepregs for the reinforcing member on the prepreg laminate for the panel on which the core is mounted; and
   heat-curing the prepreg laminates while they are sealed in a bagging film coupled to a vacuum device.

8. The composite forming method according to claim 1, wherein the core has the thin portion at one point at which the core is folded inward with the air being discharged from an inner side of the core, and a gap in the core has its cross-sectional size determined so that the thin portion is kept apart from other portions of the core while the thin portion is folded inward, so that a width of the core in the direction perpendicular to the longitudinal direction is smaller than a width of the hollow region while the thin portion is folded inward.

9. The composite forming method according to claim 1, wherein the core includes a hollow region that extends in a depth in the longitudinal direction of the core.

10. The composite forming method according to claim 2, wherein the core includes a silicone rubber or a rubber having a coefficient of linear expansion similar to that of the silicone rubber to facilitate pullout of the reinforcing jig from the core using a difference in a coefficient of linear expansion between the reinforcing jig and the core.

11. A composite forming method, comprising:
    manufacturing a composite structure body having a hollow region by disposing a rubber-made core having a tubular structure at a portion that forms the hollow region of the composite structure body, the core having a thickness varied in a direction perpendicular to a longitudinal direction of the core to be foldable inward at a thin portion;
    pulling core out of the hollow region by folding the core inward with air being discharged from an inside of the core after the composite structure body is manufactured;
    inserting a reinforcing jig into the core before the core is disposed at the portion that forms the hollow region;
    heating the composite structure body to cure the composite structure body while the reinforcing jig is inserted into the core; and
    pulling the reinforcing jig out of the core before the core is folded inward,
    wherein the reinforcing jig has a tubular shape or a stick shape, and
    wherein the reinforcing jig has a tubular shape that includes a jet port for a fluid, and the fluid is jetted from the jet port to facilitate pullout of the reinforcing jig from the core.

12. The composite forming method according to claim 1, wherein the core includes a portion thinned by forming, in the core, a cut or a groove having a length in the longitudinal direction of the core.

13. The composite forming method according to claim 1, wherein, in the particular to the longitudinal direction of the core, the thin portion has a less thickness than remaining portions of the core.

14. The composite forming method according to claim 13, wherein the composite structure body comprises a panel and a reinforcing member disposed on the panel.

15. The composite forming method according to claim 14, wherein the core includes a thick portion having a thickness more than the thin portion, the thick portion supporting, from an inner side of the reinforcing member, a rounded portion of the reinforcing member protruding in a direction away from the panel, the thick portion being disposed on an opposite side of the core with respect to a side of the core that includes the thin portion.

16. The composite forming method according to claim 15, wherein the thin portion is disposed adjacent to the panel.

17. The composite forming method according to claim 16, wherein the core further includes a sharp portion that is disposed on opposing sides of the thin portion and has a thickness more than the thickness of the thin portion, the sharp portion being configured to slide over the panel and to support, from the inner side of the reinforcing member, another rounded portion of the reinforcing member protruding toward the panel.

18. The composite forming method according to claim 11, wherein the composite forming method further comprises:
   after the composite structure body is manufactured, cooling the composite structure body, the core, and the reinforcing jig, and
wherein, after a size of the core is reduced further than the composite structure body due to a difference in a coefficient of linear expansion between the composite structure body and the core, the fluid is jetted from the jet port of the reinforcing jig.

* * * * *